(12) United States Patent
Ohse et al.

(10) Patent No.: US 12,200,824 B2
(45) Date of Patent: Jan. 14, 2025

(54) MODULAR HEATER ASSEMBLY WITH INTERCHANGEABLE AUXILIARY SENSING JUNCTIONS

(71) Applicant: Watlow Electric Manufacturing Company, St. Louis, MO (US)

(72) Inventors: Jeremy Ohse, St. Louis, MO (US); Douglas Schaefer, St. Louis, MO (US); Eric Ellis, Columbia, MO (US)

(73) Assignee: Watlow Electric Manufacturing Company, St. Louis, MO (US)

( * ) Notice: Subject to any disclaimer, the term of this patent is extended or adjusted under 35 U.S.C. 154(b) by 163 days.

(21) Appl. No.: 18/089,037

(22) Filed: Dec. 27, 2022

(65) Prior Publication Data

US 2023/0134684 A1 May 4, 2023

Related U.S. Application Data

(63) Continuation of application No. 16/840,766, filed on Apr. 6, 2020, now Pat. No. 11,540,358, which is a
(Continued)

(51) Int. Cl.
*H05B 1/02* (2006.01)
*G01K 7/02* (2021.01)
(Continued)

(52) U.S. Cl.
CPC ........... *H05B 1/0291* (2013.01); *G01K 7/021* (2013.01); *G01K 7/023* (2013.01); *H05B 1/0297* (2013.01);
(Continued)

(58) Field of Classification Search
CPC ................ H05B 3/48; H05B 2203/005; H05B 2203/014; H05B 2203/013; H05B 2203/017; H05B 3/06; H05B 2203/011; H05B 3/0014; H05B 3/26; H05B 3/28; H05B 3/46; H05B 1/0202; H05B 1/0283; H05B 2213/03; H05B 3/04; H05B 3/42; H05B 1/023; H05B 1/0233; H05B 1/0244; H05B 1/0247; H05B 2203/002; H05B 2203/009; H05B 2203/035; H05B 2213/07; H05B 3/12; H05B 3/44; H05B 3/82; H05B 1/02; H05B 1/025; H05B 1/0258; H05B 1/0261; H05B 1/0269; H05B 1/0288;
(Continued)

(56) References Cited

U.S. PATENT DOCUMENTS 2,831,951 A * 4/1958 Desloge .................. H05B 3/46
338/270
3,319,215 A * 5/1967 Moore .................. H01R 13/20
439/864
(Continued)

*Primary Examiner* — Chris Q Liu
(74) *Attorney, Agent, or Firm* — Burris Law, PLLC

(57) ABSTRACT

A heater system is provided, which includes a plurality of heaters, a controller for supplying power to the plurality of heaters, a plurality sets of auxiliary wires extending from the plurality of heaters, and a wire harness for connecting the plurality sets of auxiliary wires to the controller. Each set of auxiliary wires includes three wires, two of the three wires being made of different materials and being joined to form a thermocouple junction, such that each of the plurality of heaters is operable to function as both a heater and a temperature sensor.

17 Claims, 28 Drawing Sheets

Related U.S. Application Data continuation-in-part of application No. 15/950,358, filed on Apr. 11, 2018, now Pat. No. 11,096,248, which is a continuation-in-part of application No. 14/725,537, filed on May 29, 2015, now Pat. No. 10,728,956.

(51) Int. Cl.
*H05B 3/06* (2006.01)
*H05B 3/78* (2006.01)

(52) U.S. Cl.
CPC ............... *H05B 3/06* (2013.01); *H05B 3/78* (2013.01); *H05B 2203/014* (2013.01)

(58) Field of Classification Search
CPC ............ H05B 1/0291; H05B 2203/003; H05B 2203/021; H05B 2203/032; H05B 2203/037; H05B 2214/02; H05B 3/00; H05B 3/18; H05B 3/40; H05B 3/54; H05B 3/68; H05B 3/80
USPC .............. 219/543, 544, 229, 236, 241, 407, 219/448.17, 473, 482, 492, 534, 536, 548, 219/552, 553, 685; 392/489, 491, 503, 392/390, 395, 404
See application file for complete search history.

(56) References Cited

U.S. PATENT DOCUMENTS

| | | | | |
|---|---|---|---|---|
| 6,034,360 | A * | 3/2000 | Karlsson | G01K 7/08 250/504 R |
| 6,072,165 | A * | 6/2000 | Feldman | G01K 7/02 392/404 |
| 6,087,631 | A * | 7/2000 | Miyazaki | G01K 7/08 219/229 |
| 6,104,011 | A * | 8/2000 | Juliano | H05B 3/48 219/544 |
| 2003/0183001 | A1* | 10/2003 | Zimmermann | G01F 23/246 73/295 |
| 2004/0026410 | A1* | 2/2004 | Tsuchiya | G01K 17/20 219/534 |
| 2005/0109767 | A1* | 5/2005 | Fennewald | B29C 45/2737 219/543 |
| 2007/0235440 | A1* | 10/2007 | Gu | H05B 1/0244 219/482 |
| 2017/0023164 | A1* | 1/2017 | Wildegger | F16L 53/38 |
| 2017/0254565 | A1* | 9/2017 | Everly | H05B 3/82 |
| 2017/0273736 | A1* | 9/2017 | Paamand | H05B 1/025 |
| 2018/0088066 | A1* | 3/2018 | Schmidt | H05B 3/28 |
| 2018/0235028 | A1* | 8/2018 | Colhour | H05B 3/44 |
| 2019/0032958 | A1* | 1/2019 | Ohse | G01F 23/248 |
| 2019/0154605 | A1* | 5/2019 | Schmidt | G01K 7/16 |

* cited by examiner

MODULAR HEATER ASSEMBLY WITH INTERCHANGEABLE AUXILIARY SENSING JUNCTIONS

CROSS-REFERENCE TO RELATED APPLICATIONS

This application is a continuation application of U.S. application Ser. No. 16/840,766, filed Apr. 6, 2020, now U.S. Pat. No. 11,540,358, which is a continuation-in-part application of U.S. application Ser. No. 15/950,358, filed Apr. 11, 2018, now U.S. Pat. No. 11,096,248, which is a continuation-in-part application of U.S. application Ser. No. 14/725,537, filed May 29, 2015, now U.S. Pat. No. 10,728,956, the content of which are incorporated herein by reference in their entirety.

FIELD

The present disclosure relates to resistive heaters and to temperature sensing devices such as thermocouples.

BACKGROUND

The statements in this section merely provide background information related to the present disclosure and may not constitute prior art.

Resistive heaters are used in a variety of applications to provide heat to a target and/or environment. One type of resistive heater known in the art is a cartridge heater, which generally consists of a resistive wire heating element wound around a ceramic core. A typical ceramic core defines two longitudinal bores with power/terminal pins disposed therein. A first end of the resistive wire is electrically connected to one power pin and the other end of the resistive wire electrically connected to the other power pin. This assembly is then inserted into a tubular metal sheath of a larger diameter having an open end and a closed end, or two open ends, thus creating an annular space between the sheath and the resistive wire/core assembly. An insulative material, such as magnesium oxide (MgO) or the like, is poured into the open end of the sheath to fill the annular space between the resistive wire and the inner surface of the sheath.

The open end of the sheath is sealed, for example by using a potting compound and/or discrete sealing members. The entire assembly is then compacted or compressed, as by swaging or by other suitable process, to reduce the diameter of the sheath and to thus compact and compress the MgO and to at least partially crush the ceramic core so as to collapse the core about the pins to ensure good electrical contact and thermal transfer. The compacted MgO provides a relatively good heat transfer path between the heating element and the sheath and it also electrically insulates the sheath from the heating element.

In order to determine the proper temperature at which the heaters should be operating, discrete temperature sensors, for example thermocouples, are placed on or near the heater. Adding discrete temperature sensors to the heater and its environment can be costly and add complexity to the overall heating system.

SUMMARY

This section provides a general summary of the disclosure and is not a comprehensive disclosure of its full scope or all of its features.

In one form, a heater system is provided, which includes a plurality of heaters, a controller for supplying power to the plurality of heaters, a plurality sets of auxiliary wires extending from the plurality of heaters, and a wire harness for connecting the plurality sets of auxiliary wires to the controller. Each set of auxiliary wires includes three wires, two of the three wires being made of different materials and being joined to form a thermocouple junction, such that each of the plurality of heaters is operable to function as both a heater and a temperature sensor.

In other features, one of the at least three wires is made of a first conductive material, and the remaining ones of the wires are made of a second conductive material. The first conductive material is a copper-nickel alloy and the second conductive material is a nickel-chromium alloy. The plurality sets of auxiliary wires each include a temperature sensing wire, an auxiliary power supply wire, and an auxiliary power return wire, wherein the temperature sensing wire is joined to one of the auxiliary power supply wire and the auxiliary power return wire to form a thermocouple junction. The thermocouple junction is also joined to an end of a resistive heating element of each heater. The wire harness further includes a main power supply wire and a main power return wire directly connected to the controller, wherein one of the main power supply wire and the main power return wire is made of a same material of the temperature sensing wires.

In still other features, the heater system further includes a plurality of connectors directly connected to the plurality sets of auxiliary wires. The wire harness further includes a main power supply wire and a main power return wire, wherein the main power supply wire and the main power return wire are selectively connected to a same connector to route one of heaters as a stand-alone heater or selectively connected to different connectors such that at least some of the heaters are connected in series.

In another form, a power control system for controlling at least one heater is provided, which includes: a controller; a main power supply wire and a main power return wire directly connected to the controller; a first wire and a second wire connecting the at least one heater to the main power supply wire and the main power return wire. The main power supply wire and the first wire are connected and are made of a first conductive material. The main power return wire and the second wire are connected and are made of a second conductive material different from the first conductive material.

In other features, the first conductive material is a copper-nickel alloy, and the second conductive material is a nickel-chromium alloy. The power control system further includes at least one connector for connecting the main power supply wire and the main power return wire to the at least one heater.

In still other features, the power control system further includes a wire harness including a plurality of main power supply wires, a plurality of main power return wires, and a plurality of connectors corresponding to a plurality of heaters. The wire harness connects the controller to the plurality of heaters such that the plurality of heaters are connected in a series connection or as stand-alone heaters. The wire harness further includes a plurality of connecting wires for connecting the plurality of connectors such that the plurality of heaters are connected in series in different orders.

In still another form, a modular heater unit is provided, which includes a heater and a set of three wires extending from the heater. Two of the three wires are made of different materials and are joined to form a thermocouple junction.

In other features, the at least three wires include a temperature sensing wire made of a first conductive material, an auxiliary power supply wire and an auxiliary power return wire made of a second conductive material different from the first conductive material. The temperature sensing wire is joined to one of the auxiliary power supply wire and the auxiliary power return wire. The first conductive material is a copper-nickel alloy, and the second conductive material is a nickel-chromium alloy. The heater includes a resistive heating element, and the thermocouple junction is joined to an end of the resistive heating element.

In still other features, the modular heater unit further includes a connector part connected to the set of at least three wires. The connector part is configured to be connected to another connector part directly or via connecting wires. Only two of the set of at least three wires are connected to another electrical component to form a part of an electric circuit.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 27:
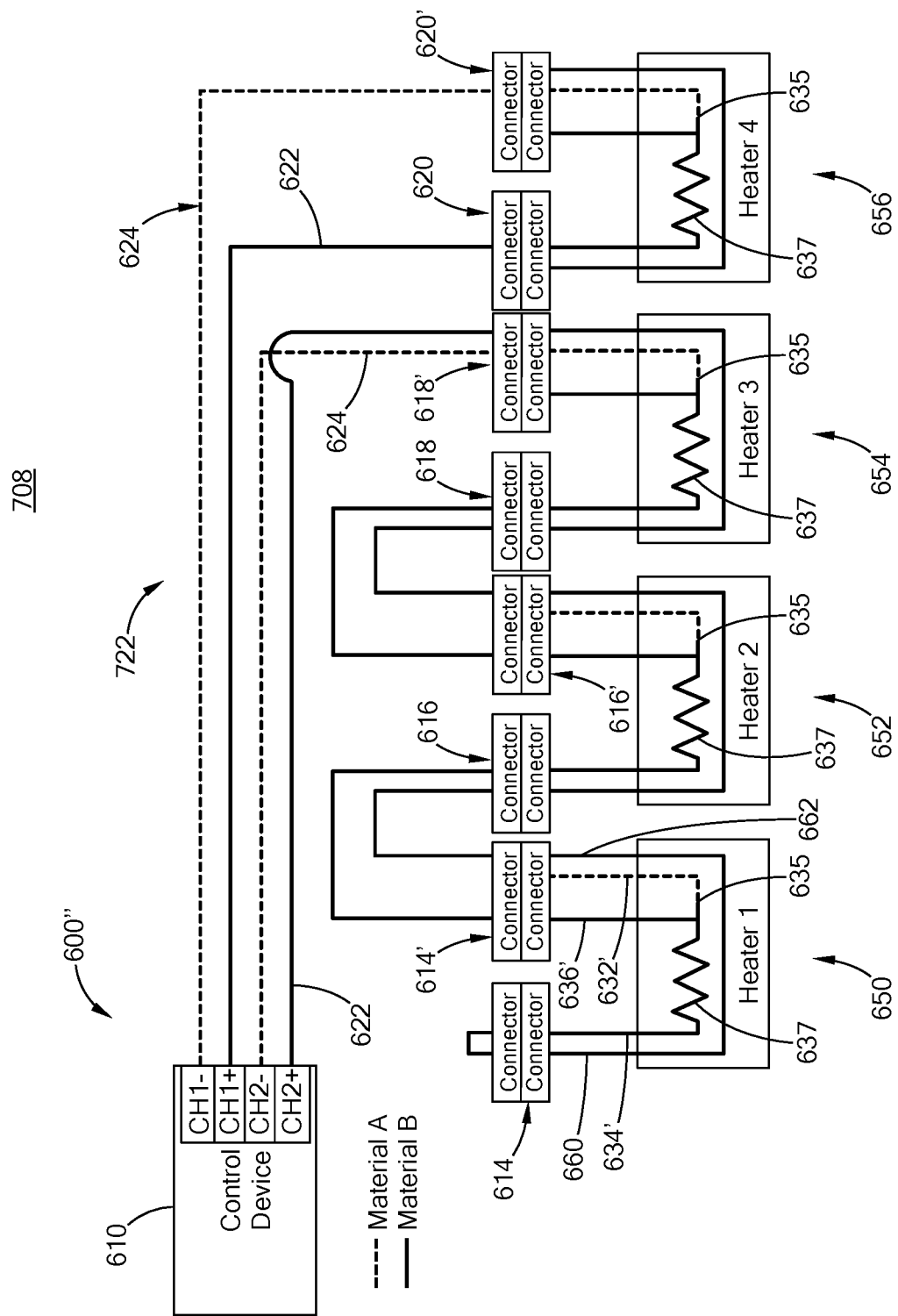
Figure 28:
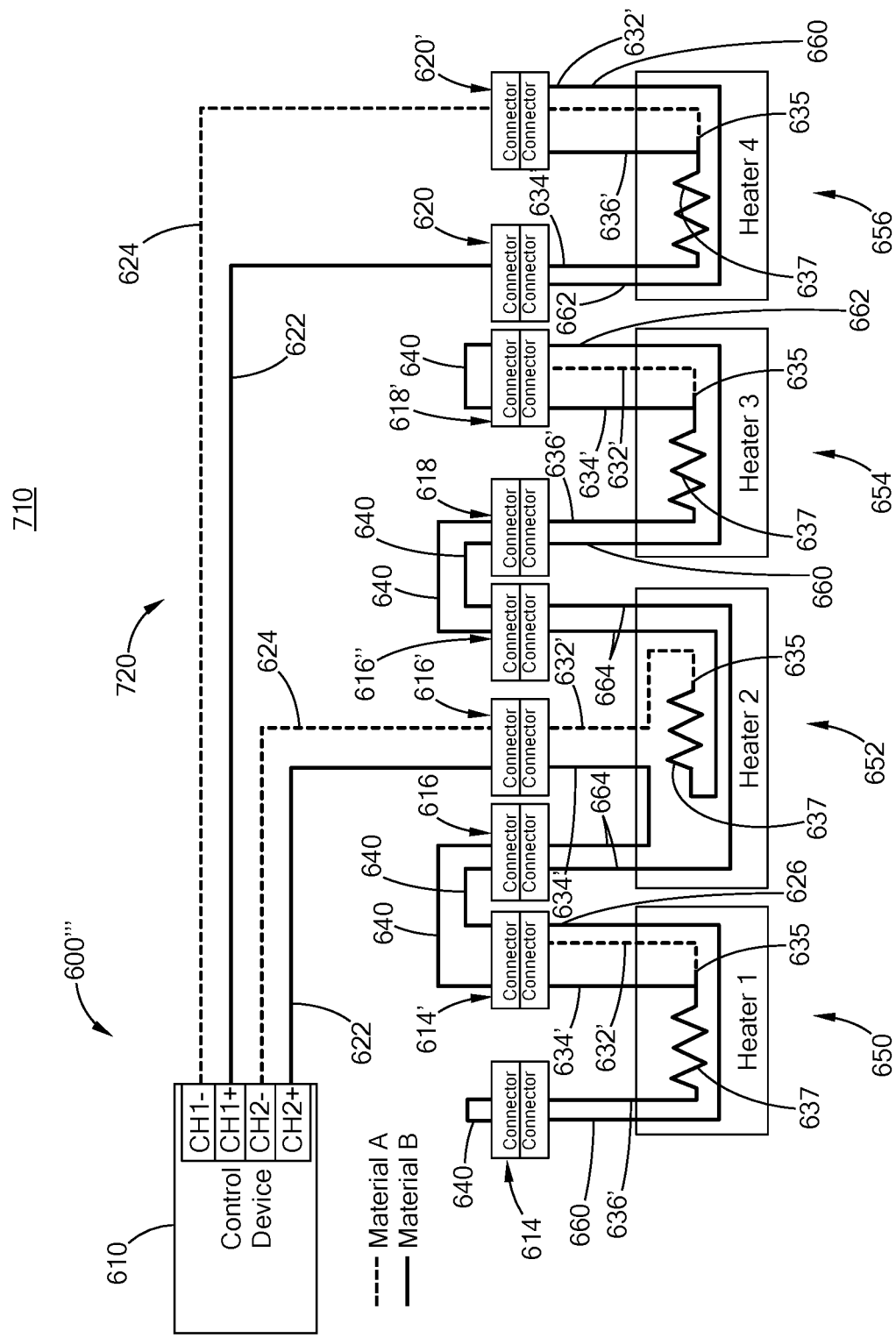

FIG. 27 is an electric diagram of a heater system including a plurality of heaters and a power control system constructed in accordance with the teachings of the present disclosure, wherein the power control system includes a wire harness that connects the plurality of heaters into a stand-alone heater and a fifth modular heater assembly; and FIG. 28 is an electric diagram of a heater system including a plurality of heaters and a power control system constructed in accordance with the teachings of the present disclosure, wherein the power control system includes a wire harness that connects the plurality of heaters into a stand-alone heater and a sixth modular heater assembly.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 1:
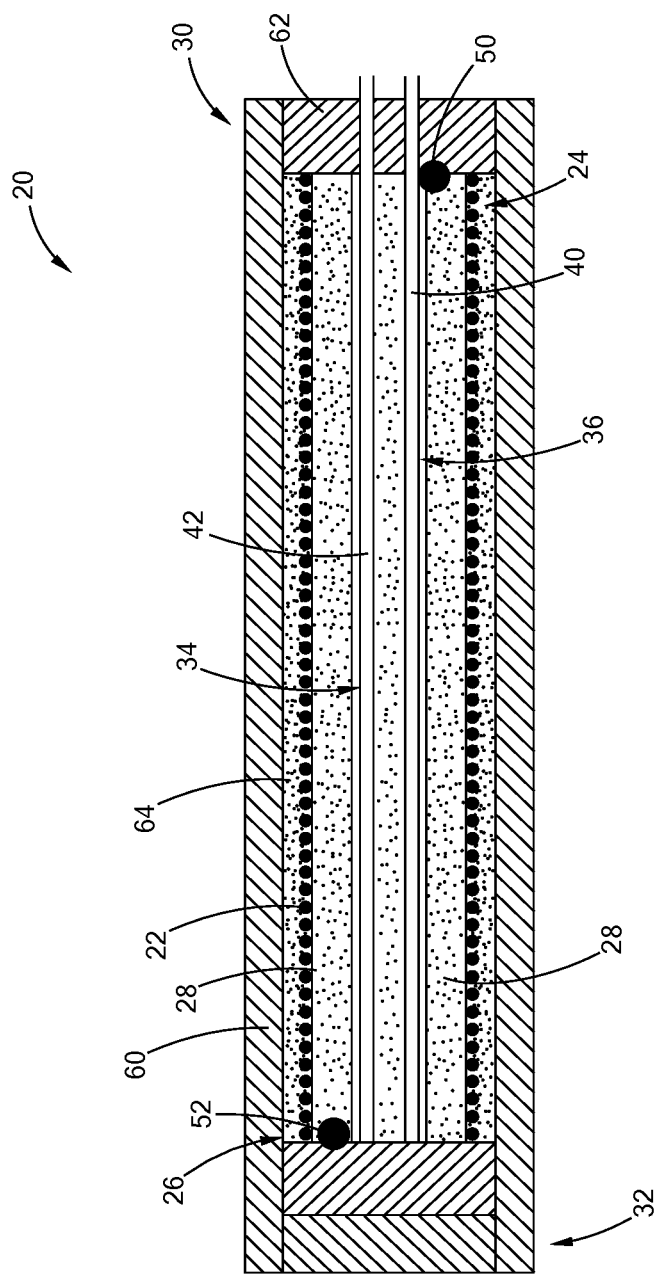
FIG. 1 is a side cross-sectional view of a resistive heater with dual purpose power pins constructed in accordance with the teachings of the present disclosure.

Referring to FIG. 1, a heater according to the teachings of the present disclosure is illustrated and generally indicated by reference numeral 20. The heater 20 in this form is a cartridge heater, however, it should be understood that the teachings of the present disclosure may be applied to other types of heaters as set forth in greater detail below while remaining within the scope of the present disclosure. As shown, the heater 20 comprises a resistive heating element 22 having two end portions 24 and 26, and the resistive heating element 22 is in the form of a metal wire, such as a nichrome material by way of example. The resistive heating element 22 is wound or disposed around a non-conductive portion (or core in this form) 28. The core 28 defines a proximal end 30 and a distal end 32 and further defines first and second apertures 34 and 36 extending through at least the proximal end 30.

The heater 20 further comprises a first power pin 40 that is made of a first conductive material and a second power pin 42 that is made of a second conductive material that is dissimilar from the first conductive material of the first power pin 40. Further, the resistive heating element 22 is made of a material that is different from the first and second conductive materials of the first and second power pins 40, 42 and forms a first junction 50 at end 24 with the first power pin 40 and a second junction 52 at its other end 26 with the second power pin 42. Because the resistive heating element 22 is a different material than the first power pin 40 at junction 50 and is a different material than the second power pin 42 at junction 52, a thermocouple junction is effectively formed and thus changes in voltage at the first and second junctions 50, 52 are detected (as set forth in greater detail below) to determine an average temperature of the heater 20 without the use of a separate/discrete temperature sensor.

In one form, the resistive heating element 22 is a nichrome material, the first power pin 40 is a Chromel® nickel alloy, and the second power pin 42 is an Alumel® nickel alloy. Alternately, the first power pin 40 could be iron, and the second power 42 could be constantan. It should be appreciated by those skilled in the art that any number of different materials and their combinations can be used for the resistive heating element 22, the first power pin 40, and the second power pin 42, as long as the three materials are different and a thermocouple junction is effectively formed at junctions 50 and 52. The materials described herein are merely exemplary and thus should not be construed as limiting the scope of the present disclosure.

In one application, the average temperature of the heater 20 may be used to detect the presence of moisture. If moisture is detected, moisture management control algorithms can then be implemented via a controller (described in greater detail below) in order to remove the moisture in a controlled manner rather than continuing to operate the heater 20 and a possible premature failure.

As further shown, the heater 20 includes a sheath 60 surrounding the non-conductive portion 28 and a sealing member 62 disposed at the proximal end 30 of the non-conductive portion 28 and extending at least partially into the sheath 60 to complete the heater assembly. Additionally, a dielectric fill material 64 is disposed between the resistive heating element 22 and the sheath 60. Various constructions and further structural and electrical details of cartridge heaters are set forth in greater detail in U.S. Pat. Nos. 2,831,951 and 3,970,822, which are commonly assigned with the present application and the contents of which are incorporated herein by reference in their entirety. Therefore, it should be understood that the form illustrated herein is merely exemplary and should not be construed as limiting the scope of the present disclosure.

Figure 2:
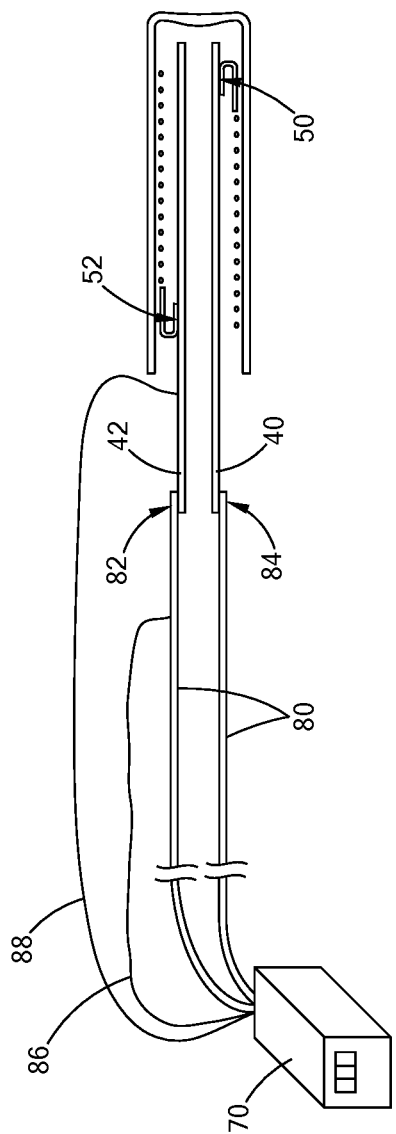
FIG. 2 is a perspective view of the resistive heater of FIG. 1 and a controller with lead wires constructed in accordance with the teachings of the present disclosure.

Referring now to FIG. 2, the present disclosure further includes a controller 70 in communication with the power pins 40, 42 and configured to measure changes in voltage at the first and second junctions 50, 52. More specifically, the controller 70 measures millivolt (mV) changes at the junctions 50, 52 and then uses these changes in voltage to calculate an average temperature of the heater 20. In one form, the controller 70 measures changes in voltage at the junctions 50, 52 without interrupting power to the resistive heating element 22. This may be accomplished, for example, by taking a reading at the zero crossing of an AC input power signal. In another form, power is interrupted and the controller 70 switches from a heating mode to a measuring mode to measure the changes in voltage. Once the average temperature is determined, the controller 70 switches back to the heating mode, which is described in greater detail below. More specifically, in one form, a triac is used to switch AC power to the heater 20, and temperature information is gathered at or near the zero-cross of the power signal. Other forms of AC switching devices may be employed while remaining within the scope of the present disclosure, and thus the use of a triac is merely exemplary and should not be construed as limiting the scope of the present disclosure.

Figure 3:
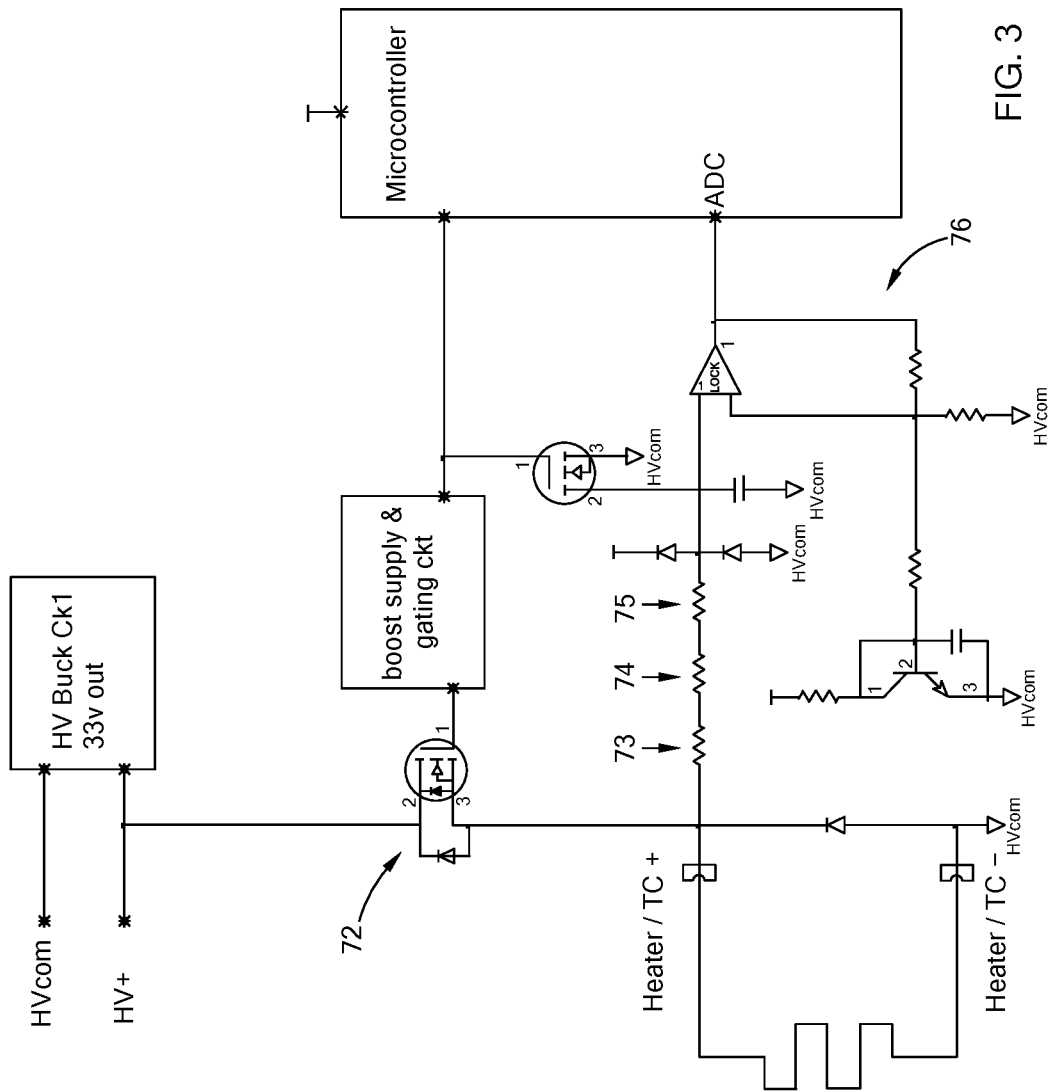
FIG. 3 is a circuit diagram illustrating a switching circuit and measurement circuit constructed in accordance with one form of the present disclosure.

Alternately, as shown in FIG. 3, a FET 72 is used as a switching device and means of measuring voltage during an off-period of the FET with a DC power supply. In one form, three (3) relatively large resistors 73, 74, and 75 are used to form a protective circuit for the measurement circuit 76. It should be understood that this switching and measurement circuit is merely exemplary and should not be construed as limiting the scope of the present disclosure.

Referring back to FIG. 2, a pair of lead wires 80 are connected to the first power pin 40 and the second power pin 42. In one form, the lead wires 80 are both the same material such as, by way of example, copper. The lead wires 80 are provided to reduce the length of power pins needed to reach the controller 70, while introducing another junction by virtue of the different materials at junctions 82 and 84. In this form, in order for the controller 70 to determine which junction is being measured for changes in voltage, signal wires 86 and 88 may be employed such that the controller 70 switches between the signal wires 86 and 88 to identify the junction being measured. Alternately, the signal wires 86 and 88 may be eliminated and the change in voltage across the lead wire junctions 82 and 84 can be negligible or compensated through software in the controller 70.

Figure 4:
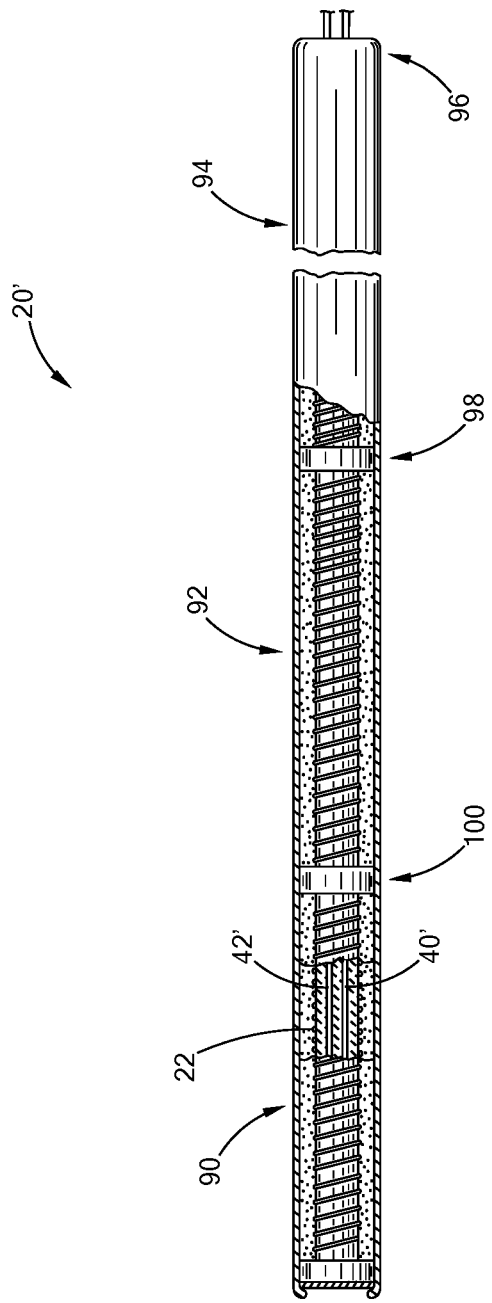
FIG. 4 is a side cross-sectional view of an alternate form of the heater having a plurality of heating zones and constructed in accordance with the teachings of the present disclosure.

Referring now to FIG. 4, the teachings of the present disclosure may also be applied to a heater 20' having a plurality of zones 90, 92 and 94. Each of the zones includes its own set of power pins 40', 42' and resistive heating element 22' as described above (only one zone 90 is illustrated for purposes of clarity). In one form of this multi-zone heater 20', the controller 70 (not shown) would be in communication with the end portions 96, 98, and 100 of each of the zones in order to detect voltage changes and thus determine an average temperature for that specific zone. Alternately, the controller 70 could be in communication with only the end portion 96 to determine the average temperature of the heater 20' and whether or not moisture may be present as set forth above. Although three (3) zones are shown, it should be understood that any number of zones may be employed while remaining within the scope of the present disclosure.

Figure 5:
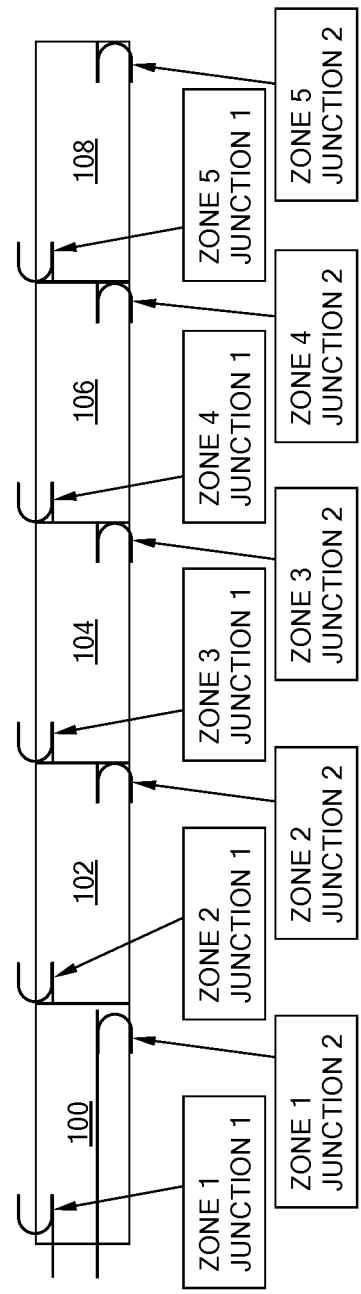
FIG. 5 is a side elevational view of an alternate form of the present disclosure illustrating a plurality of heaters connected in sequence and constructed in accordance with the teachings of the present disclosure.

Turning now to FIG. 5, the teachings of the present disclosure may also be applied to a plurality of separate heaters 100, 102, 104, 106, and 108, which may be cartridge heaters, and which are connected in sequence as shown. Each heater comprises first and second junctions of the dissimilar power pins to the resistive heating element as shown and thus the average temperature of each heater 100, 102, 104, 106, and 108 can be determined by a controller 70 as set forth above. In another form, each of the heaters 100, 102, 104, 106, and 108 has its own power supply pin and a single power return pin is connected to all of the heaters in order to reduce the complexity of this multiple heater form. In this form with cartridge heaters, each core would include passageways to accommodate power supply pins for each successive heater.

Figure 6:
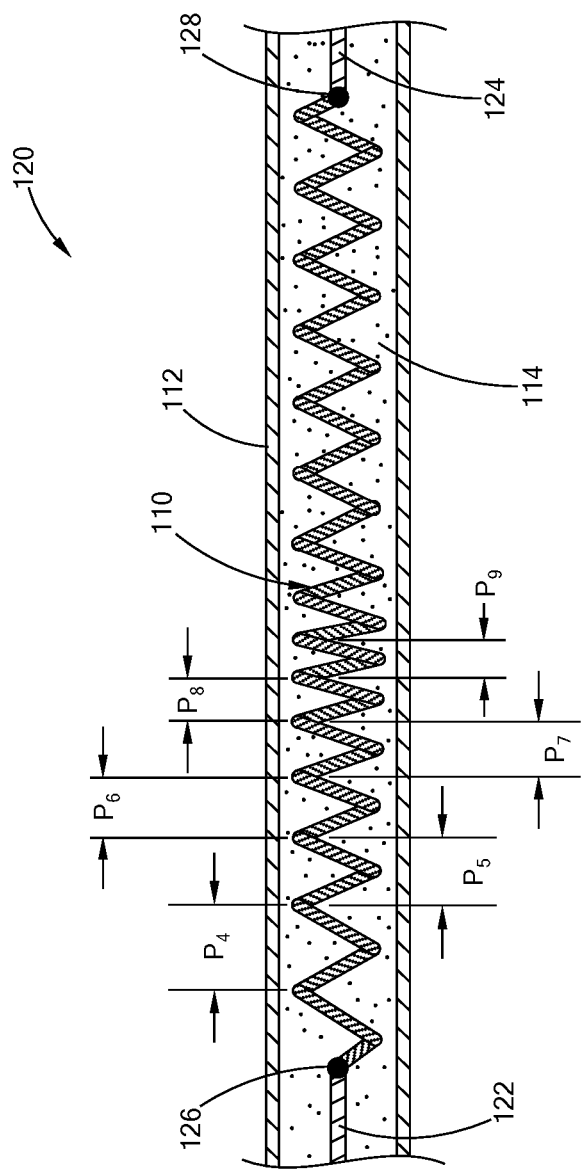
FIG. 6 is a side cross-sectional view of another form of the heater having a resistive element with a continuously variable pitch and constructed in accordance with the teachings of the present disclosure.
Figure 7:
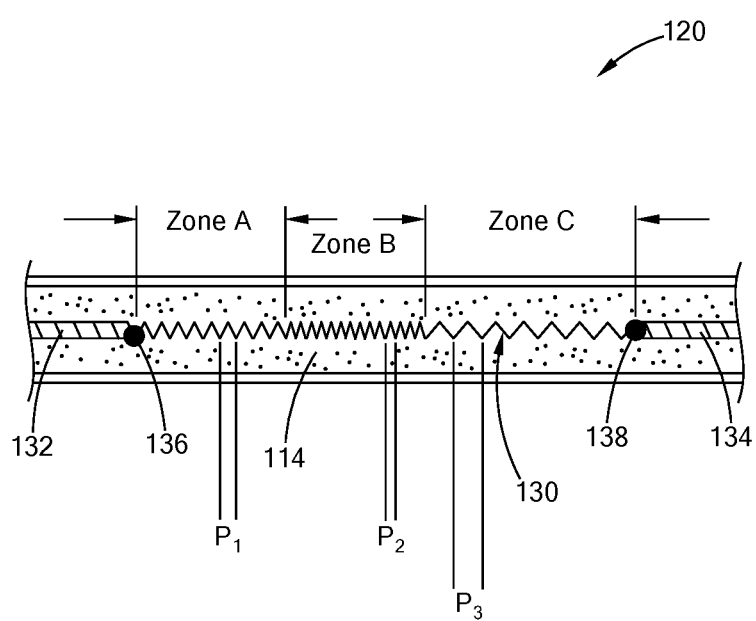
FIG. 7 is a side cross-sectional view of another form of the heater having a resistive element with different pitches in a plurality of heating zones and constructed in accordance with the teachings of the present disclosure.

Referring now to FIGS. 6 and 7, a pitch of the resistive heating element 110 may be varied in accordance with another form of the present disclosure in order to provide a tailored heat profile along the heater 120. In one form (FIG. 5), the resistive heating element 110 defines a continuously variable pitch along its length. More specifically, the resistive heating element 110 has a continuously variable pitch with the ability to accommodate an increasing or decreasing pitch $P_4$-$P_9$ on the immediately adjacent next 360 degree coil loop. The continuously variable pitch of resistive heating element 110 provides gradual changes in the flux density of a heater surface (e.g., the surface of a sheath 112). Although the principle of this continuously variable pitch is shown as applied to a tubular heater having filled insulation 114, the principles may also be applied to any type of heater, including without limitation, the cartridge heater as set forth above. Additionally, as set forth above, the first power pin 122 is made of a first conductive material, the second power pin 124 is made of a second conductive material that is dissimilar from the first conductive material of the first power pin 122, while the resistive heating element 110 is made of a material that is different from the first and second conductive materials of the first and second power pins 122, 124 so that changes in voltage at the first and second junctions 126, 128 are detected to determine an average temperature of the heater 120.

In another form (FIG. 7), the resistive heating element 130 has pitches $P_1$, $P_2$, and $P_3$ in zones A, B, and C, respectively. P3 is greater than P1, and P1 is greater than P2. The resistive heating element 130 has a constant pitch along the length of each zone as shown. Similarly, the first power pin 132 is made of a first conductive material, the second power pin 134 is made of a second conductive material that is dissimilar from the first conductive material of the first power pin 132, while the resistive heating element 130 is made of a material that is different from the first and second conductive materials of the first and second power pins 132, 134 so that changes in voltage at the first and second junctions 136, 138 are detected to determine an average temperature of the heater 120.

Figure 8:
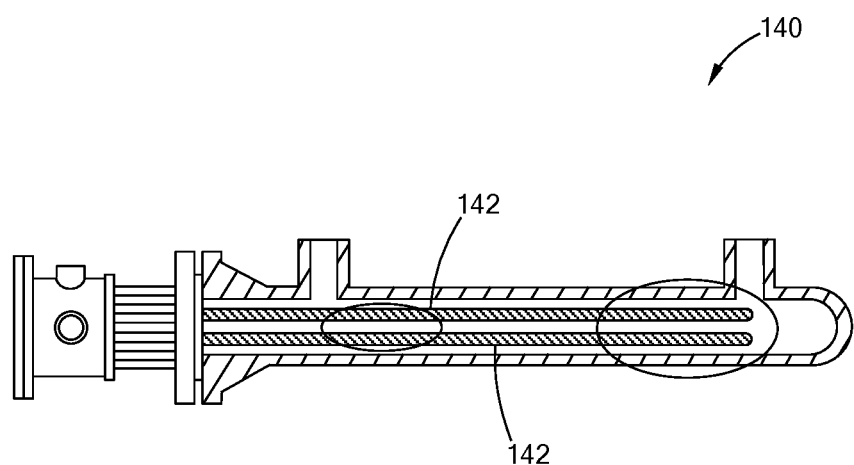
FIG. 8 is a side cross-sectional view of a heat exchanger employing a heater and constructed in accordance with the teachings of the present disclosure.

Referring to FIG. 8, the heater and dual purpose power pins as described herein have numerous applications, including by way of example a heat exchanger 140. The heat exchanger 140 may include one or a plurality of heating elements 142, and each of the heating elements 142 may further include zones or variable pitch resistive heating elements as illustrated and described above while remaining within the scope of the present disclosure. It should be understood that the application of a heat exchanger is merely exemplary and that the teachings of the present disclosure may be employed in any application in which heat is being provided while also requiring a temperature measurement, whether that temperature be absolute or for another environmental condition such as the presence of moisture as set forth above.

Figure 9:
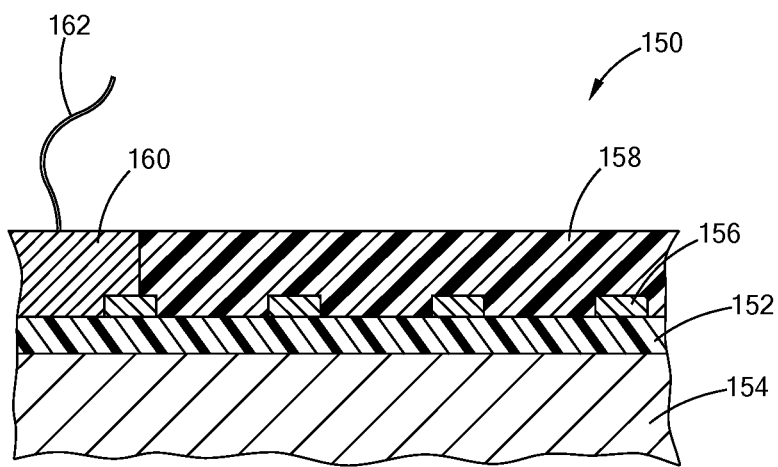
FIG. 9 is a side cross-sectional view illustrating a layered heater employing the dual purpose power pins and constructed in accordance with the teachings of the present disclosure.

As shown in FIG. 9, the teachings of the present disclosure may also be applied to other types of heaters such as a layered heater 150. Generally, the layered heater 150 includes a dielectric layer 152 that is applied to a substrate 154, a resistive heating layer 156 applied to the dielectric layer 152, and a protective layer 158 applied over the resistive heating layer 156. A junction 160 is formed between one end of a trace the resistive layer 158 and a first lead wire 162 (only one end is shown for purposes of clarity), and similarly a second junction is formed at another end, and following the principles of the present disclosure as set forth above, voltage changes at these junctions are detected in order to determine the average temperature of the heater 150. Such layered heaters are illustrated and described in greater detail in U.S. Pat. No. 8,680,443, which is commonly assigned with the present application and the contents of which are incorporated herein by reference in their entirety.

Other types of heaters rather than, or in addition to the cartridge, tubular, and layered heaters as set forth above may also be employed according to the teachings of the present disclosure. These additional types of heaters may include, by way of example, a polymer heater, a flexible heater, heat trace, and a ceramic heater. It should be understood that these types of heaters are merely exemplary and should not be construed as limiting the scope of the present disclosure.

Figure 10:
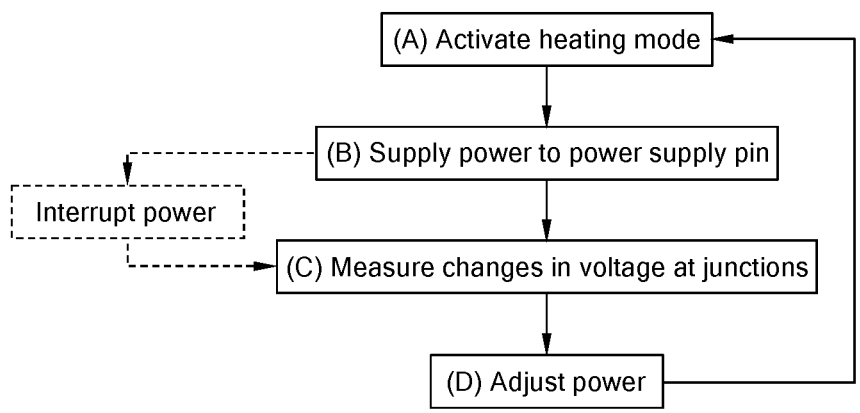
FIG. 10 is a flow diagram illustrating a method in accordance with the teachings of the present disclosure.

Referring now to FIG. 10, a method of controlling at least one heater in accordance with the teachings of the present disclosure is shown. The method comprises the steps of:

(A) activating a heating mode to supply power to a power supply pin, the power supply pin made of a first conductive material, and to return the power through a power return pin, the power return pin made of a conductive material that is dissimilar from the first conductive material;

(B) supplying power to the power supply pin, to a resistive heating element having two ends and made of a material that is different from the first and second conductive materials of the power supply and return pins, the resistive heating element forming a first junction at one end with the power supply pin and a second junction at its other end with the power return pin, and further supplying the power through the power return pin;

(C) measuring changes in voltage at the first and second junctions to determine an average temperature of the heater;

(D) adjusting the power supplied to the heater as needed based on the average temperature determined in step (C); and (E) repeating steps (A) through (D).

In another form of this method, as shown by the dashed lines, step (B) is interrupted while the controller switches to a measuring mode to measure the change in voltage, and then the controller is switched back to the heating mode.

Figure 11:
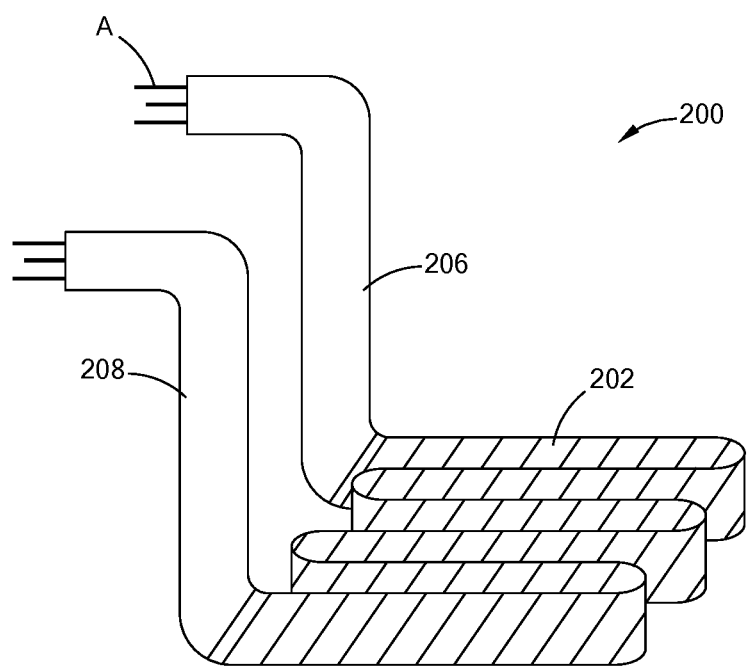
FIG. 11 is a perspective view of a heater for use in fluid immersion heating and constructed in accordance with the teachings of the present disclosure.
Figure 12:
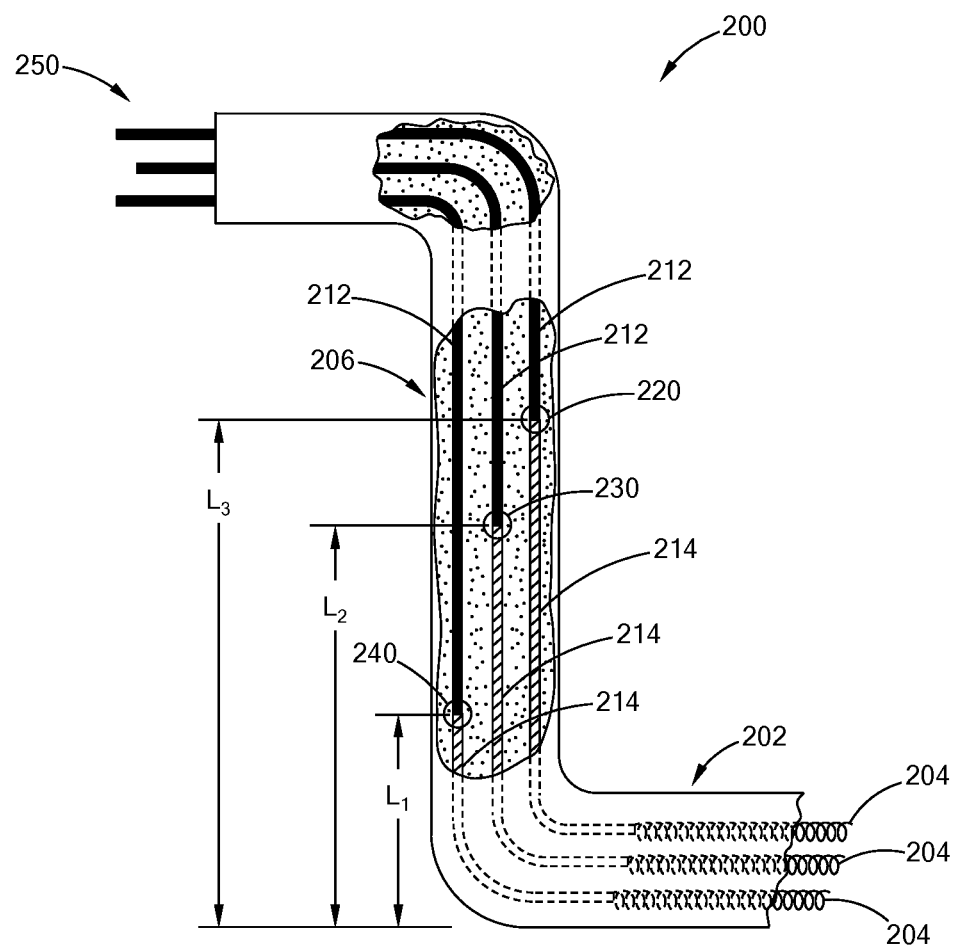
FIG. 12 is a side cross-sectional view of a portion of the heater of FIG. 11 in accordance with the teachings of the present disclosure.
Figure 13:
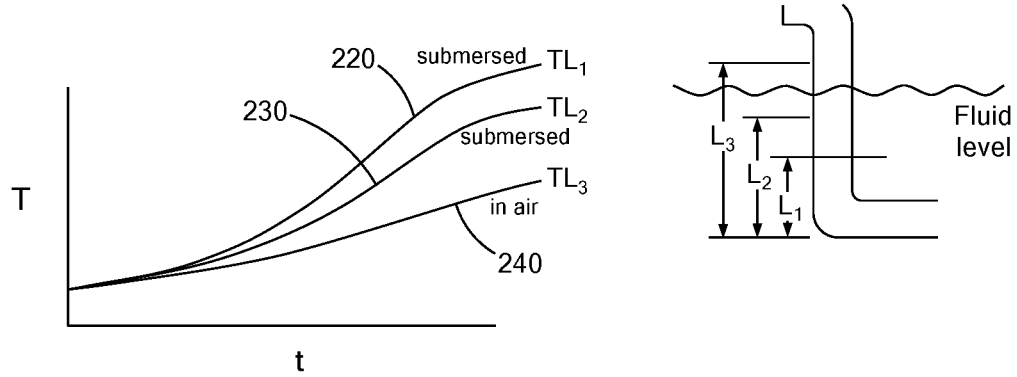
FIG. 13 is a graph illustrating exemplary differences in temperature at the various junctions of the heater of FIG. 10 in accordance with the teachings of the present disclosure.

Yet another form of the present disclosure is shown in FIGS. 11-13, wherein a heater for use in fluid immersion heating is illustrated and generally indicated by reference numeral 200. The heater 200 comprises a heating portion 202 configured for immersion into a fluid, the heating portion 202 comprising a plurality of resistive heating elements 204, and at least two non-heating portions 206, 208 contiguous with the heating portion 202 (only one non-heating portion 206 is shown in FIG. 11). Each non-heating portion 206, 208 defines a length and comprises a corresponding plurality of sets of power pins electrically connected to the plurality of heating elements 204. More specifically, each set of power pins comprises a first power pin 212 made of a first conductive material and a second power pin 214 made of a second conductive material that is dissimilar from the first conductive material of the first power pin 212. The first power pins 212 are electrically connected to the second power pins 214 within the non-heating portions 206, 208 to form junctions 220, 230, and 240. As further shown, the second power pins 214 extend into the heating portion 202 and are electrically connected to the corresponding resistive heating elements 204. Further, the second power pins 214 define a cross-sectional area that is larger than the corresponding resistive heating element 204 so as to not create another junction or measurable amount of heat at the connection between the second power pins 24 and the resistive heating elements 204.

As further shown, a termination portion 250 is contiguous with the non-heating portion 206, and the plurality of first power pins 212 exit the non-heating portion 206 and extend into the termination portions 250 for electrical connection to lead wires and a controller (not shown). Similar to the previous description, each of the resistive heating elements 204 are made of a material that is different from the first and second conductive materials of the first and second power pins 212, 214, and wherein each of the junctions 220, 230, and 240 of the first power pin 212 to the second power pin 214 is disposed at a different location along the lengths of the non-heating portions 206, 208. More specifically, and by way of example, junction 220 is at a distance $L_1$, junction 230 is at a distance $L_2$, and junction 240 is at a distance $L_3$.

As shown in FIG. 13, with temperature of the junctions 220, 230, and 240 over time "t," the junction 220 is submerged in the fluid F, the junction 230 is submerged but not as deep in the fluid, and the junction 240 is not submerged. Accordingly, detecting changes in voltage at each of the junctions 220, 230, and 240 can provide an indication of the fluid level relative to the heating portion 202. It is desirable, especially when the fluid is oil in a cooking/fryer application, that the heating portion 202 not be exposed to air during operation so as to not cause a fire. With the junctions 220, 230, and 240 according to the teachings of the present disclosure, a controller can determine if the fluid level is too close to the heating portion 202 and thus disconnect power from the heater 200.

Although three (3) junctions 220, 230, and 240 are illustrated in this example, it should be understood that any number of junctions may be employed while remaining within the scope of the present disclosure, provided that the junctions are not in the heating portion 202.

Figure 14:
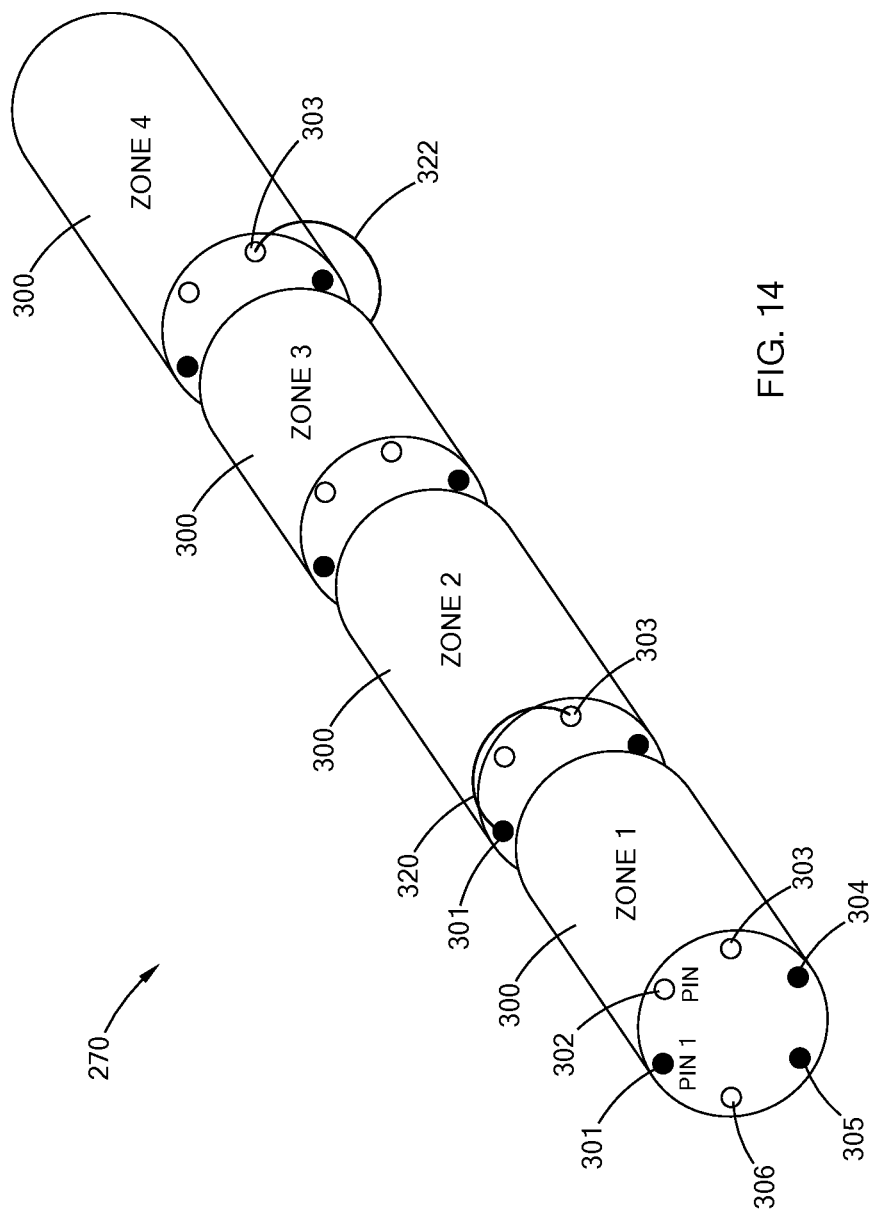
FIG. 14 is a perspective view of another form of the present disclosure having a plurality of heater cores in zones and constructed in accordance with the teachings of the present disclosure.

Referring now to FIG. 14, yet another form of the present disclosure includes a plurality of heater cores 300 arranged in zones of a heater system 270 as shown. The heater cores 300 in this exemplary form are cartridge heaters as described above, however, it should be understood that other types of heaters as set forth herein may also be employed. Accordingly, the cartridge heater construction in this form of the present disclosure should not be construed as limiting the scope of the present disclosure.

Each heater core 300 includes a plurality of power pins 301, 302, 303, 304, and 305 as shown. Similar to the forms described above, the power pins are made of different conductive materials, and more specifically, power pins 301, 304, and 305 are made of a first conductive material, power pins 302, 303, and 306 are made of a second conductive material that is dissimilar from the first conductive material. As further shown, at least one jumper 320 is connected between dissimilar power pins, and in this example, power pin 301 and power pin 303, in order to obtain a temperature reading proximate the location of the jumper 320. The jumper 320 may be, for example, a lead wire or other conductive member sufficient to obtain the millivolt signal indicative of temperature proximate the location of the jumper 320, which is also in communication with the controller 70 as illustrated and described above. Any number of jumpers 320 may be used across dissimilar power pins, and another location is illustrated at jumper 322 between power pin 303 and power pin 305, between ZONE 3 and ZONE 4.

In this exemplary form, power pins 301, 303, and 305 are neutral legs of heater circuits between adjacent power pins 302, 304, and 306, respectively. More specifically, a heater circuit in ZONE 1 would be between power pins 301 and 302, with the resistive heating element (e.g., element 22 shown in FIG. 1) between these power pins. A heater circuit in ZONE 2 would be between power pins 303 and 304, with the resistive heating element between these two power pins. Similarly, a heater circuit in ZONE 3 would be between power pins 305 and 306, with the resistive heating element between these two power pins. It should be understood that these heater circuits are merely exemplary and are constructed according to the teachings of a cartridge heater described above and with reference to FIG. 1. Any number and configurations of heater circuits with multiple heater cores 300 and zones may be employed while remaining within the scope of the present disclosure. The illustration of four (4) zones and a cartridge heater construction is merely exemplary and it should be understood that the dissimilar power pins and jumpers may be employed with other types of heaters and in a different number and/or configuration of zones while remaining within the scope of the present disclosure.

Figure 15:
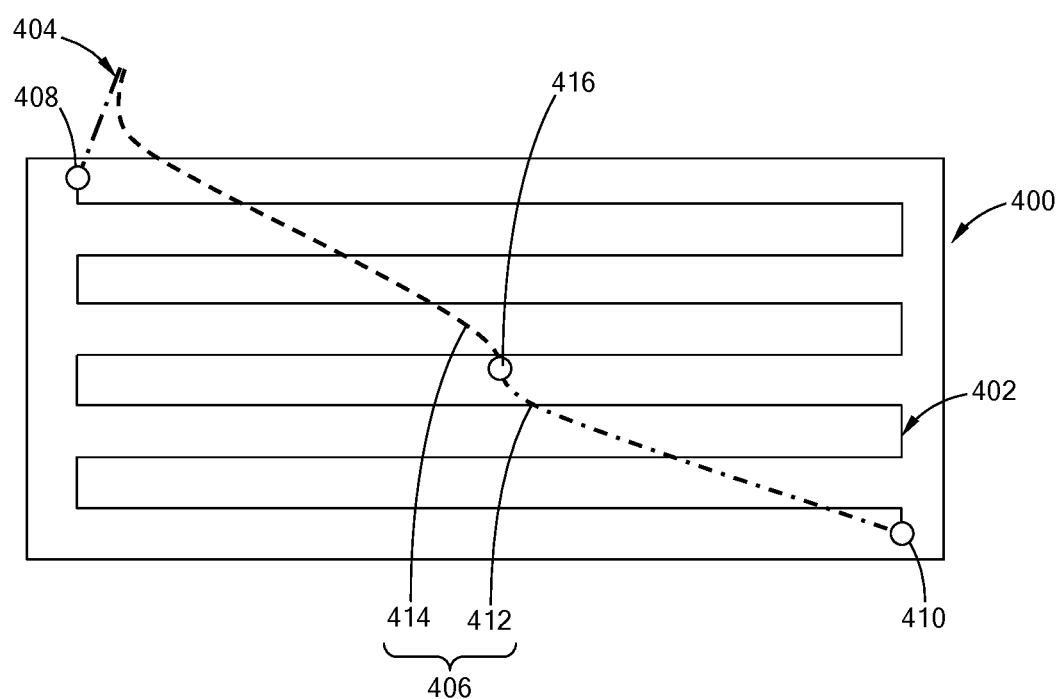
FIG. 15 illustrates a heater having a primary sensing junction in accordance with the teaching of the present disclosure.

Referring now to FIG. 15, in one form, a heater 400 is configured to include a primary sensing junction that can be arranged within the heater 400 or outside the heater 400 for measuring temperature. The heater 400 includes a resistive heating element 402, a first power pin 404, and a second power pin 406. The resistive heating element 402 has a first end and a second end. The first power pin 402 is connected to the first end of the resistive heating element 402 to form a first junction 408, and the second power pin 406 is connected to the second end of the resistive heating element 402 to form a second junction 410. The first power pin 404 and the second power pin 406 are operable to supply power to the heating element 402 by way of the controller.

The second power pin 406 includes a first lead wire 412 and a second lead wire 414. The first lead wire 412 is connected to the second end of the resistive heating element 402 to form the second junction 410, and the second lead wire 414 is connected to the first lead wire 412 to form a primary sensing junction 416 at a first reference area. The second lead wire 414 is configured to connect the resistive heating element 402 to the controller by way of the first lead wire 412.

In one form, the first lead wire 412 and the second lead wire 414 are made of dissimilar conductive materials or more particularly, materials having different Seebeck coefficients. For example, various combinations of nickel alloys, iron, constantan, Alumel® or the like may be used. The difference in material of the first lead wire 412 and the second lead wires 414 is represented by the different style lines in FIG. 15 (e.g., dash line for the second lead wire 414 and dashed-dotted line for first lead wire 412). Since the materials are different, the primary sensing junction 416 is effectively a thermocouple to generate a voltage change that is measured to determine a temperature at the first reference area. Accordingly, in this form, the junctions 408 and 410 for connecting to the resistive heating element 402 is separated from a sensing location. Thus, the heater 400 is not restricted to detecting temperature at the ends of the heating element 402, and a temperature measurement may be detected at various locations within the heater 400. Furthermore, in one form, the first lead wire 412 and the second lead wire 414 are configured to have the primary sensing junction 416 outside of the heater 400.

As discussed with respect to FIG. 2, the controller (not shown in FIG. 15) is in communication with the first power pin 404 and the second power pin 406 and is configured to supply power to the resistive heater element 402 via the power pins 404 and 406. The controller is also configured to calculate the temperature at the first reference area based on the voltage change created by the sensing junction 416 using the Seebeck coefficients of the materials.

In one form, the resistive heating element 402, the first power pin 404, and the first lead wire 412 of the second power pin 406 are made of the same conductive material or of materials with similar Seebeck properties (i.e., substantially the same Seebeck coefficients). Accordingly, a voltage change created by the first junction 408 and the second junction 410 is substantially zero, and the temperature measurement determined by the controller is based on the voltage change created by the primary sensing junction 416.

In another form, the resistive heating element 402, the first power pin 404, and/or the first lead wire 412 of the second power pin 406 are made of different conductive materials. With such configurations, the material of the second lead wire 414 is selected such that the Seebeck coefficient of the second lead wire 414 is the most dissimilar from that of the resistive heating element 402, the first power pin 404, and the first lead wire 412 of the second power pin 406. Accordingly, the primary sensing junction 416 is provided as the largest contributor to overall temperature measurement, and any temperature measurement from the first and second junctions 408 and 410 are minimized.

As discussed above, the temperature can be detected at the zero-crossing of the power signal. Alternatively, the controller is configured to switch between a heating mode for directing power to the resistive heating element and a measuring mode for measuring changes in voltage at the primary sensing junction 416 to determine the temperature at the reference area.

Figure 16:
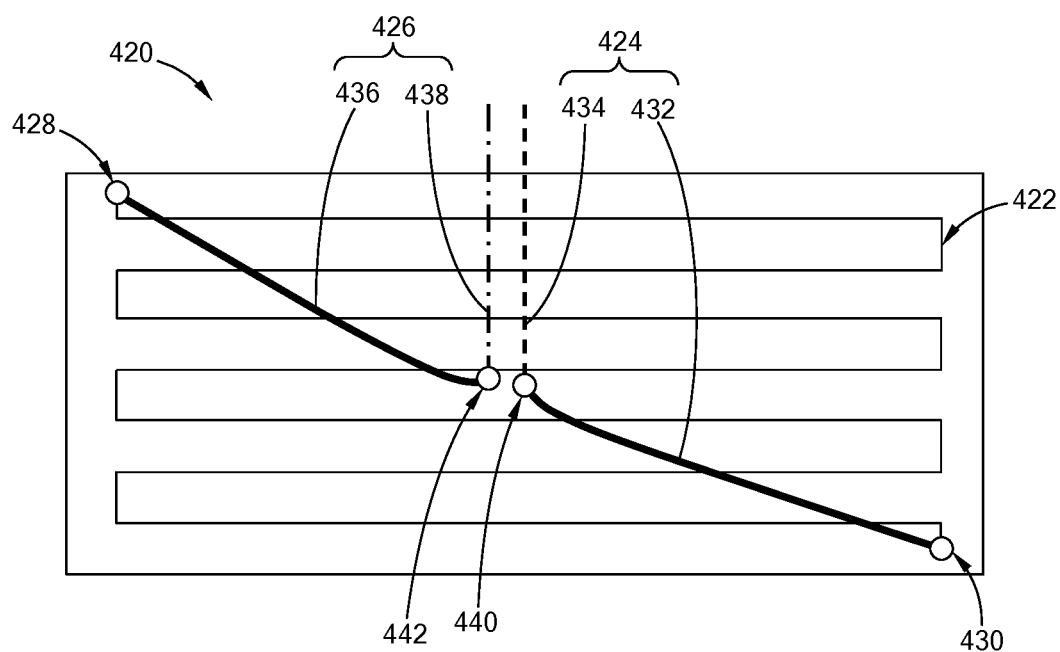
FIG. 16 illustrates a heater having two primary sensing junctions in accordance with the teachings of the present disclosure.

Referring to FIG. 16, in one form, a heater 420 includes two sensing junctions in proximity to each other to detect a temperature at a virtual point between the two sensing junctions. Here, the heater 420 comprises a resistive heating element 422, a second power pin 424, and a first power pin 426. The resistive heating element 422 comprises a first end and a second end. The first power pin 426 forms a first junction 428 with the first end of the heating element 422, and the second power pin 424 forms a second junction 430 with the second end of the heating element 422. The second power pin 424 is configured in a similar manner as the second power pin 406 of FIG. 15, and thus, includes a first lead wire 432 that is connected to the resistive heating element 422 to form the second junction 430, and a second lead wire 434 that is connected to the first lead wire 432 to form a first primary sensing junction 440 at a first reference area within the heater 420.

In this form, the first power pin 426 is configured in a similar manner as the second power pin 424, and comprises two lead wires (i.e., a third lead wire 436 and a fourth lead wire 438) to form a sensing junction. More particularly, the third lead wire 436 is connected to the first end of the resistive heating element 422 to form the first junction 428, and the fourth lead wire 438 forms a second primary sensing junction 442 with the third lead wire 436 at a second reference area. The second primary sensing junction 442 is provided at a second reference area of the heater 420 that is adjacent and proximate to the first reference area having the first primary sensing junction 440. While the sensing junctions 440 and 442 are provided as within the heater 420, the sensing junctions 440 and 442 can also be provided outside the heater 420.

Similar to the second power pin 424, the third lead wire 436 is made of a different conductive material than that of the fourth lead wire 438, and is of different conductive material as that of the second lead wire 434 of the second power pin 424. Accordingly, the second primary sensing junction 442 is effectively a thermocouple used in conjunction with the first primary sensing junction to determine a temperature between the first and second reference areas. Furthermore, the resistive heating element 422, the first lead wire 432 of the second power pin 424, and the third lead wire 436 of the first power pin 426 are made of the same conductive material or of materials with similar Seebeck properties, such that a voltage change created by the first junction 428 and the second junction 430 is substantially zero, and the temperature measurement determined by the controller is based on the voltage changes at the sensing junctions 440 and 442.

The controller (not shown in FIG. 16) is configured to supply power to the heating element 422 via the first power pin 426 and the second power pin 424, and to measure a temperature at a virtual point between the two sensing junctions 440 and 442 based on the voltage changes created by the junctions 440 and 442. In one form, the temperature at the first and second reference areas are presumed to be substantially the same, and thus, the temperature detected by the controller is associated with a virtual point between the first and second reference areas.

Figure 17:
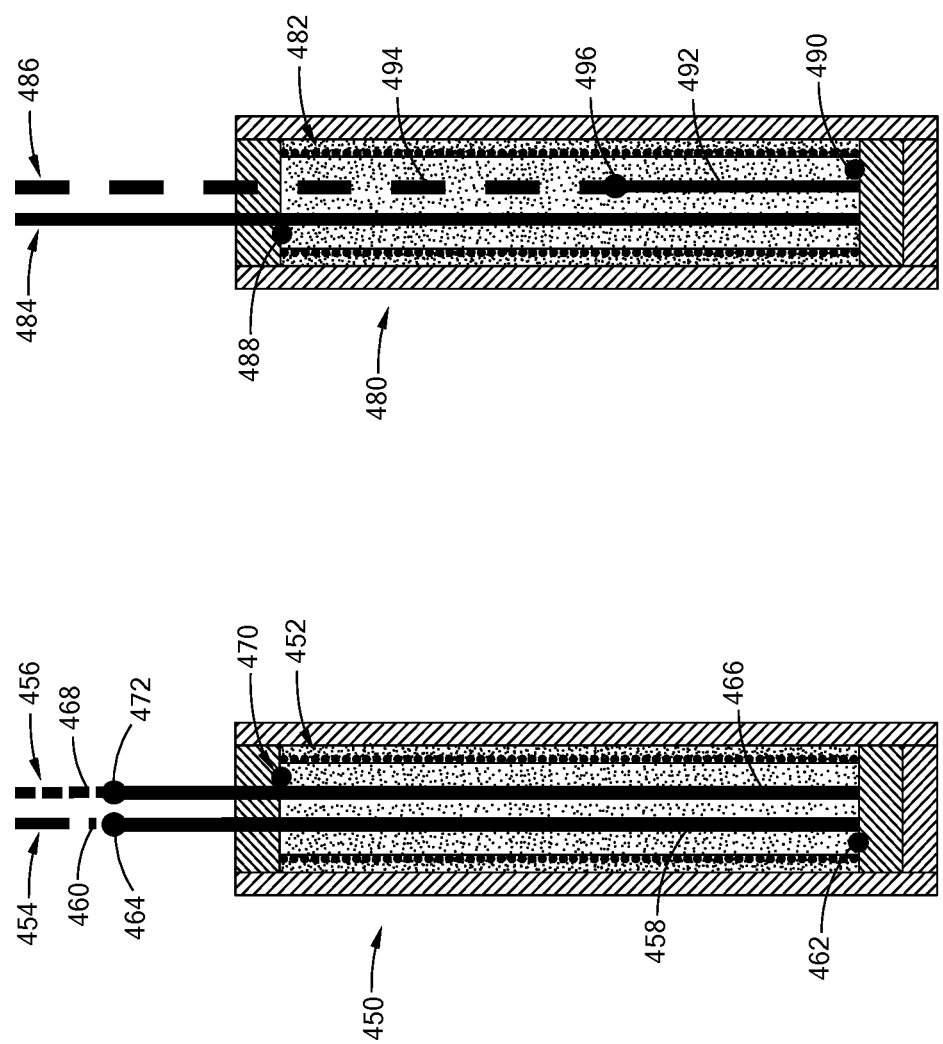
FIGS. 17A and 17B are perspective views of cartridge heaters having primary sensing junctions in accordance with teachings of the present disclosure.

Referring to FIG. 17A and FIG. 17B, in one form, the primary sensing junction is provided in a cartridge heater for measuring a temperature at a virtual point outside of the heater or at a reference area within the heater. FIG. 17A illustrates a cartridge heater 450 that includes a resistive heating element 452 in the form of a metal wire, a first power pin 454, and a second power pin 456. The cartridge heater 450 is configured to include two sensing junctions provided outside of the heater 450 to measure a temperature at a virtual point between the two sensing junctions.

More particularly, in one form, the resistive heating element 452 is wound or disposed around a non-conductive portion (or a core in this form) as discussed with respect to FIG. 1. The first power pin 454 comprises a first lead wire 458 and a second lead wire 460. The first lead wire 458 is connected to the first end of the resistive heating element 452 to form a first junction 462, and the second lead wire 460 forms a first primary sensing junction 464 with the first lead wire 458 at a first reference area outside the heater 450. The second power pin 456 comprises a third lead wire 466 and a fourth lead wire 468. The third lead wire 466 is connected to the resistive heating element 452 to form a second junction 470. The fourth lead wire 468 is connected to the third lead wire 466 to form a second primary sensing junction 472 at a second reference area outside the heater 450. The first and second primary sensing junctions 464 and 472 are positioned adjacent and in proximity to one another.

In one form, the resistive heating element 452, the first lead wire 458 of the first power pin 454, and the third lead wire 466 of the second power pin 456 are made of the same material or of materials having similar Seebeck properties, and are different from the material of the second lead wire 460 of the first power pin 454 and the fourth lead wire 468 of the second power pin 456. In addition, the material of the second lead wire 460 of the first power pin 454 is different from the material of the fourth lead wire 468 of the second power pin 456. Accordingly, the first and second primary junctions 464 and 472 operate as thermocouples to detect a temperature at a virtual point between the two junctions 464 and 472.

FIG. 17B illustrates a cartridge heater 480 having one primary sensing junction located within the heater. The cartridge heater 480 includes a resistive heating element 482 having two ends, a first power pin 484, and a second power pin 486. The first power pin 484 forms a first junction 488 with a first end of the heating element 482 and the second power pin 486 forms a second junction 490 with a second end of the heating element 482. Similar to the heater of FIG. 15, the second power pin 486 includes a first lead wire 492 and a second lead wire 494, which are made of different material (i.e., have different Seebeck coefficients). The first lead wire 492 is connected to the second end of the resistive heating element 482 to form the second junction 490, and the second lead wire 494 is connected to the first lead wire 492 to form a primary sensing junction 496 at a first reference area within the heater 480. Accordingly, the primary sensing junction 490 is operable as a thermocouple to measure a temperature at the first reference area.

In one form, the resistive heating element 482, the first power pin 484, and the first lead wire 492 of the second power pin 486 are made of the same conductive material or of materials having similar Seebeck properties. Accordingly, a voltage change created by the first junction 488 and the second junction 490 is substantially zero, and the temperature measurement determined by the controller is based on the voltage change created by the primary sensing junction 490.

Figure 18:
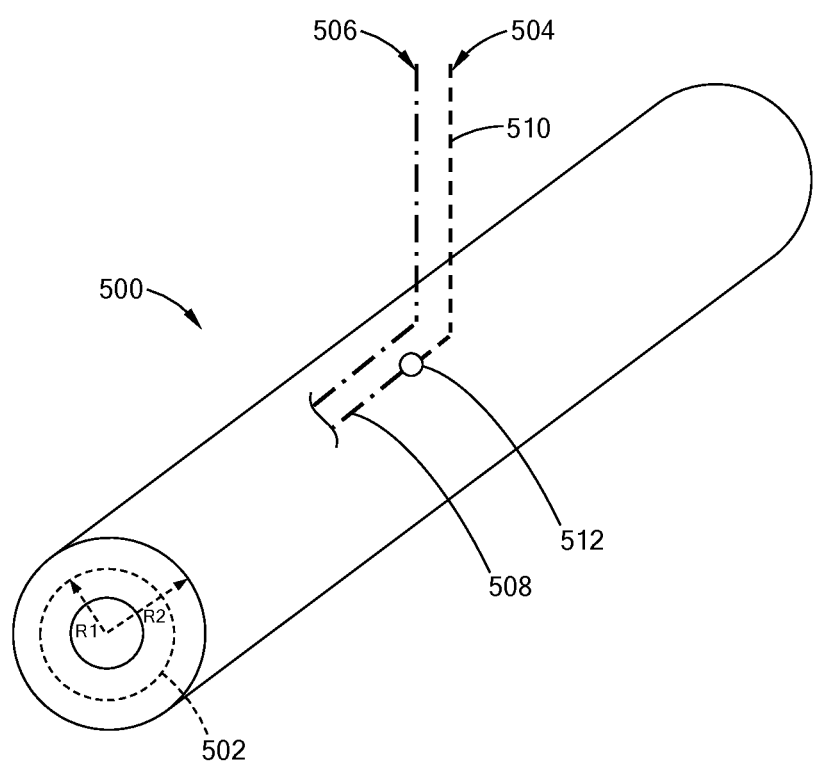
FIG. 18 is a perspective via tubular heater having a primary sensing junction and a two-wire heating element in accordance with teachings of the present disclosure.

Referring to FIG. 18, the primary sensing junction of the present disclosure may also be used as part of a heat flux sensor to estimate a temperature between inner surface of a heater and an outer surface of the heater. More particularly, in one form, a heater 500 is operable to heat a fluid (e.g., a gas) following through a tube, and comprises a resistive heating (i.e., thermal) element 502 (shown with phantom lines), a first power pin 504, and a second power pin 506. While not fully illustrated in FIG. 18, the resistive heating element 502 is configured to extend through the heater 500, and is protected by a cover. The first power pin 504 and the second power pin 506 extend into the cover of the heater 500 to form a first junction with a first end of the heating element 502 and a second junction with a second end of the heating element 502, respectively.

The resistive heating element 502 is a "two-wire" heating element such that it functions as a heater and as a temperature sensor. Such two-wire capability is disclosed in, for example, U.S. Pat. No. 7,196,295, which is commonly assigned with the present application and incorporated herein by reference in its entirety. Generally, for a two-wire system, the heating element 502 is made of a high temperature coefficient of resistance (TCR) material. A controller (not shown in FIG. 18) is in communication with the first and second power pins 504 and 506, and configured to measure voltage (i.e., mV) changes across the power pins 504 and 506. Using the voltage change, the controller calculates an average temperature of the resistive heating element 502 (e.g., about R1).

The first power pin 504 includes a first lead wire 508 and a second lead wire 510, which are made of different materials (i.e., have different Seebeck coefficients). The first lead wire 508 forms the second junction with the heating element 502, and the second lead wire 510 forms a primary sensing junction 512 with the first lead wire 508 at a second reference area that is along an outer surface (i.e., R2) of the heater 500 (i.e., along a plane that is different than that of the heating element 502). Accordingly, the primary sensing junction 512 is operable as a thermocouple to measure a temperature at the second reference area based on a voltage change created by the sensing junction 512. The resistive heating element 502, the second power pin 506, and the first lead wire 508 of the first power pin 504 are made of the same material or made of materials having similar Seebeck properties.

In one form, the controller is configured to estimate a temperature at a virtual point between an inner surface (i.e., first reference area) and an outer surface (a second reference area) of the heater 500 based on the temperature measurement of the heating element 502, the temperature at the primary sensing junction 512, and power delivered to the heater 500 from the controller. More particularly, the controller determines the average temperature of the heating element at the first reference area using the voltage change across the power pins 506 and 504, as described with respect to the two-wire system. The controller further determines the temperature at the second reference area based on the voltage change created by the primary sensing junction 512 and the Seebeck coefficient of the first and second lead wire 508 and 510. Using the two measurements, the power being provided, and the heater geometry, the controller may calculate a temperature at a third reference area at a desired location in the heater 500 (e.g., any location within the heater). In addition, if the geometry of the heater 500 is known, the controller can also be configured to determine a heat flux between the inner surface and the outer surface of the heater 500. The heat flux can be used to, for example, detect entry areas of cold fluid, adjust temperature setpoints, and/or other suitable system controls. While the heater 500 is illustrated as a tube, the heater may be configured in other suitable shapes (e.g., a flat plate) and still be within the scope of the present disclosure.

Furthermore, in one form, before the heater 500 is energized, the heater 500 is substantially at room temperature, such that the primary sensing junction 512 is at the same or substantially the same temperature as the high TCR element wire (i.e., the heating element 502). The controller is configured to measure the temperature using the primary sensing junction 512, and further measure the resistance of the heating element 502. The controller associates the resistance of the heater 500 with the temperature measured by the primary sensing junction 512, and uses this baseline value to covert other resistances to a temperature, thereby calibrating the heater element 502.

Figure 19:
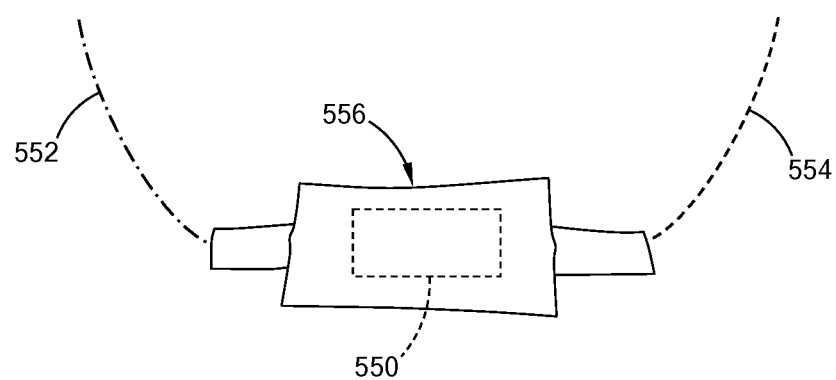
FIG. 19 illustrates a primary sensing junction with enhanced temperature measurement features in accordance with teachings of the present disclosure.

Referring to FIG. 19, a primary sensing junction can be configured in various suitable ways to improve temperature measurement along a surface. For example, in one form, a primary sensing junction 550 is formed by a first lead wire 552 and a second lead wire 554 that are made of different materials. The sensing junction 550 has a planar shape (i.e., flat) and is surrounded by a heat diffuser 556 that is a thermally conductive material (e.g., copper) to improve thermal contact with the surface and to diffuse heat coming from the heating element.

The primary sensing junction of the present disclosure operates as a thermocouple to enables temperature measurements at different locations within and even, outside of the heater. Accordingly, temperature measurement is not restricted to the ends of the heating element. In addition, the heater no longer requires a discrete temperature sensor, thereby reducing the complexity of the heater.

Figure 20:
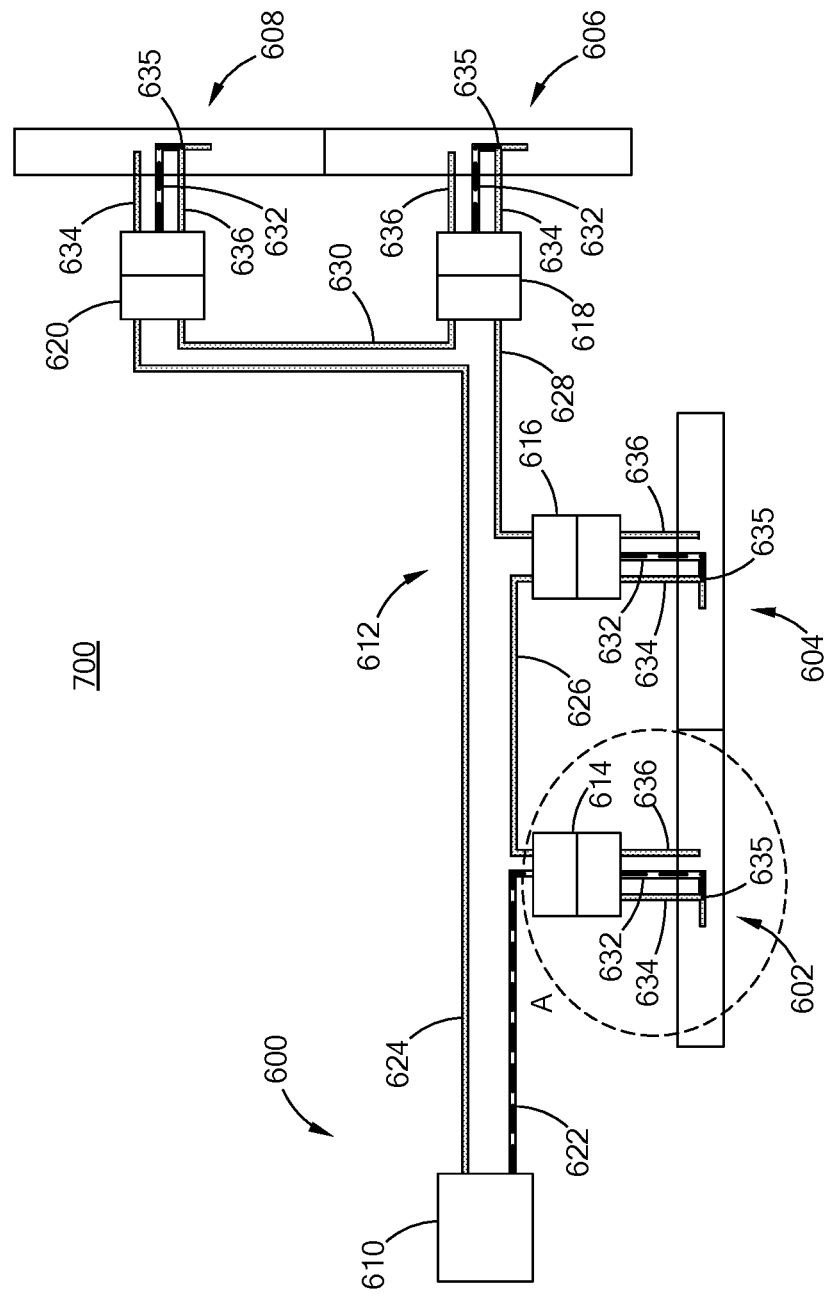
FIG. 20 is a schematic diagram of a heater system including a plurality of heaters and a power control system constructed in accordance with the teachings of the present disclosure, wherein the power control system includes a wire harness that connects the plurality of heaters in a first series connection to form a first modular heater assembly.

Referring to FIG. 20, a heater system 700 including a power control system 600 and a plurality of heaters 602, 604, 606, 608 connected and controlled by the power control system 600 is shown. The power control system 600 includes a controller 610, a wire harness 612, and a plurality sets of auxiliary wires 632, 634, 636 connected to and extending from the plurality of heaters. The wire harness 612 and the plurality sets of auxiliary wires 632, 634, 636 connect the controller 610 to the plurality of heaters 602, 604, 606, 608. The plurality of heaters include a first heater 602, a second heater 604, a third heater 606, and a fourth heater 608. The wire harness 612 may be used to connect some or all of the plurality of heaters 602, 604, 606, and 608 in series to form different modular heater assemblies or as stand-alone heaters, or a combination thereof, which will be described in more detail below. Any number of heaters may be connected by the wire harness 612, and the heaters may be any type of heaters without departing from the scope of the present disclosure. The controller 610 is configured to supply power to the plurality of heaters 602, 604, 606, 608, determine temperatures of the plurality of heaters 602, 604, 606, 608 based on temperature signals transmitted from the heaters, and control the temperatures of the plurality of heaters 602, 604, 606, 608 based on the measured temperatures and target temperatures.

The wire harness 612 includes a plurality of connectors 614, 616, 618, 620 and a plurality of electrical wires for connecting the controller 610 to the plurality of heaters 602, 604, 606, 608. In one form, the plurality of connectors 614, 616, 618, 620 may be circular plastic connectors (CPC), which include built-in pins and sockets to allow for a wide range of power and signal transmission options, and which are structurally designed to allow for easy and quick connect/disconnect between the connectors and the electrical wires. In the illustrative example of FIG. 20, the number of the plurality of connectors 614, 616, 618, 620 is equal to the number of the plurality of heaters 602, 604, 606, 608 such that each of the heaters is connected to another heater(s) or the controller 610 via a corresponding connector.

In the illustrative example of FIG. 20, the plurality of electrical wires include a main power supply wire 622, a main power return wire 624, and a plurality of connecting wires 626, 628, 630. The main power supply wire 622 and the main power return wire 624 are directly connected to the controller 610 for routing electric current to and out of the plurality of heaters 602, 604, 606, 608, respectively. The plurality of connecting wires include a first connecting wire 626, a second connecting wire 628, and a third connecting wire 630 for connecting one of the connectors 614, 616, 618, 620 to another one of the connectors 614, 616, 618, 620. The plurality sets of auxiliary wires are disposed between the connectors 614, 616, 618, 620 and the plurality of heaters 602, 604, 606, 608. It should be understood that three (3) connecting wires and four (4) heaters are merely exemplary and the illustrations and descriptions herein should not be construed as limiting the scope of the present disclosure. It is also understood that the plurality sets of auxiliary wires may be alternatively configured to be in the form of conductive pins without departing from the scope of the present disclosure.

Figure 21A:
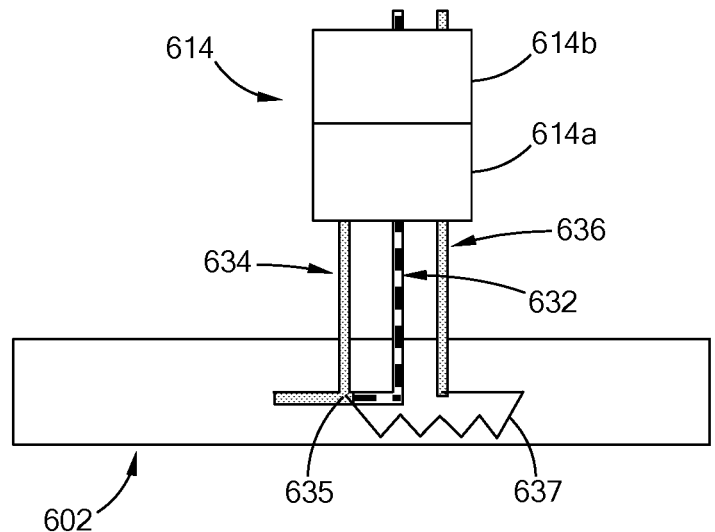
FIG. 21A is an enlarged view of portion A of FIG. 20.

Referring to FIG. 21A, each set of auxiliary wires for a corresponding heater includes three wires, wherein two of the three wires are made of different materials and are joined to form a thermocouple junction 635, which is also joined to an end of a resistive heating element 637 of the heater 602. More specifically, each set of auxiliary wires includes a temperature sensing wire 632, an auxiliary power supply wire 634, and an auxiliary power return wire 636. The temperature sensing wire 632 is made of a first conductive material (as shown in dashed line), whereas the auxiliary power supply wire 634 and the auxiliary power return wire 634 are made of a second conductive material (as shown in solid lines) different from the first conductive material.

The temperature sensing wire 632 (made of the first conductive material) is joined to one of the auxiliary power supply wire 634 and the auxiliary power return wire 634 (made of the second conductive material) to form a thermocouple junction 635 therebetween. As shown in FIG. 21A, the temperature sensing wire 632 of each set of auxiliary wires is joined to the auxiliary power supply wire 634 and joined to one of a pair of terminal areas of a resistive heating element 637 to form a thermocouple junction 635 therebetween. The auxiliary power return wire 636 is connected to the other one of the terminal areas of the resistive heating element 637. As such, electric current flows from the temperature sensing wire 632, through the resistive heating element 637, to the auxiliary power return wire 636. The three wires may be fixed to the terminal areas of a resistive heating element 637 of a heater to become a part of the heater.

While three wires extend from each heater and are connected to the corresponding connector, only two of the three wires are used to carry electric current and the remaining one of the three wires is bypassed during each mode of heater operation. Which one of the three wires is bypassed depends on how the heaters are connected by the wire harness, particularly by the connectors 614, 616, 618, 620 each including a first connector part and a second connector part. For example, as shown in FIG. 21A, the connector 614 includes a first connector part 614a and a second connector part 614b. All three wires are connected to a first connector part of a specific connector, but the second connector part of the specific connector connects only two of the three wires to a second connector part of another connector or the controller 610 via connecting wire(s), the main power supply wire, or the main power return wire. As shown in FIG. 21A in conjunction with FIG. 20, the temperature sensing wire 632 and the auxiliary power return wire 636 for the first heater 602 are used to carry electric current and the auxiliary power supply wire 634 is bypassed. As clearly shown in FIG. 20, the auxiliary power supply wires 634 and the auxiliary power return wires 636 for the other heaters 604, 606, 608 are used to carry electric current and the temperature sensing wires 632 are bypassed. The thermocouple junction 635 on the first heater 602 measures the temperature of the first heater, and the temperature sensing wire 632 and the auxiliary power return wire 636 for the first heater 602 transmit a signal relating to the temperature of the heater to the controller 610.

As an example, the first conductive material may be a copper-nickel alloy such as Constantan, and the second conductive material may be a nickel-chromium alloy such as Chromel®. Any combination of first and second conductive materials suitable for forming a thermocouple junction for temperature sensing purposes may be used without departing from the scope of the present disclosure.

Figure 21B:
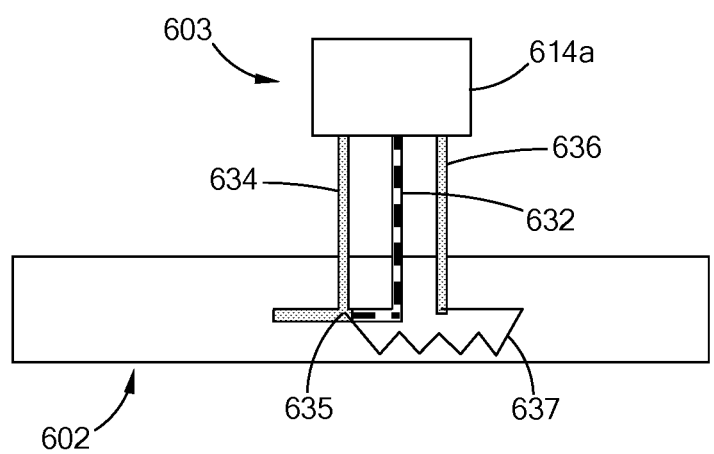
FIG. 21B is schematic diagram of a modular heater unit including a heater, a three-wire mechanism extending from the heater, and a connector part.

Referring to FIG. 21B, each of the connectors 614, 616, 618, 620 may include a first connector part and a mating second connector part (which may be a socket and plug assembly, for example). For example, the connector 614 may include a first connector part 614a and a second connector part 614b. The heater 602 and the corresponding set of auxiliary wires (i.e., the temperature sensing wire 632, the auxiliary power supply wire 634, and the auxiliary power return wire 636) are attached to the first connector part 614a to form a modular heater unit 603. The modular heater unit 603 can be easily connected to other electrical components, such as another modular heater unit or the controller 610, by using mating connector parts and proper connecting wires to achieve various wiring connections, all variations of which should be construed as falling within the scope of the present disclosure.

The set of auxiliary wires extending from the corresponding heater constitutes a three-wire mechanism to allow the heater to be used as both a heater and a temperature sensor. In the first modular heater assembly of FIG. 20, the second, third and fourth heaters 604, 606, 608 are connected by the wire harness 612 in a way such that the second, third and fourth heaters are used as heaters only to generate a desired heat output. In the second, third and fourth heaters 604, 606, 608, the auxiliary power supply wires 634 and the auxiliary power return wires 636 are selectively used to form a part of the electric circuit, whereas the temperature sensing wires 632 are bypassed. The first heater 602 is used as both a heater and a temperature sensor by selectively using the temperature sensing wire 632 and the auxiliary power supply wire 634 to form a part of the electric circuit, and by bypassing the auxiliary power supply wire 634. During the temperature sensing mode, the thermocouple junction 635 on the first heater 602 is used to measure a temperature of the heater, and the temperature sensing wire 632 and the auxiliary power return wire 636 for the first heater and other wires in the electric circuit are used to transmit a temperature signal to the controller 610.

Figure 22:
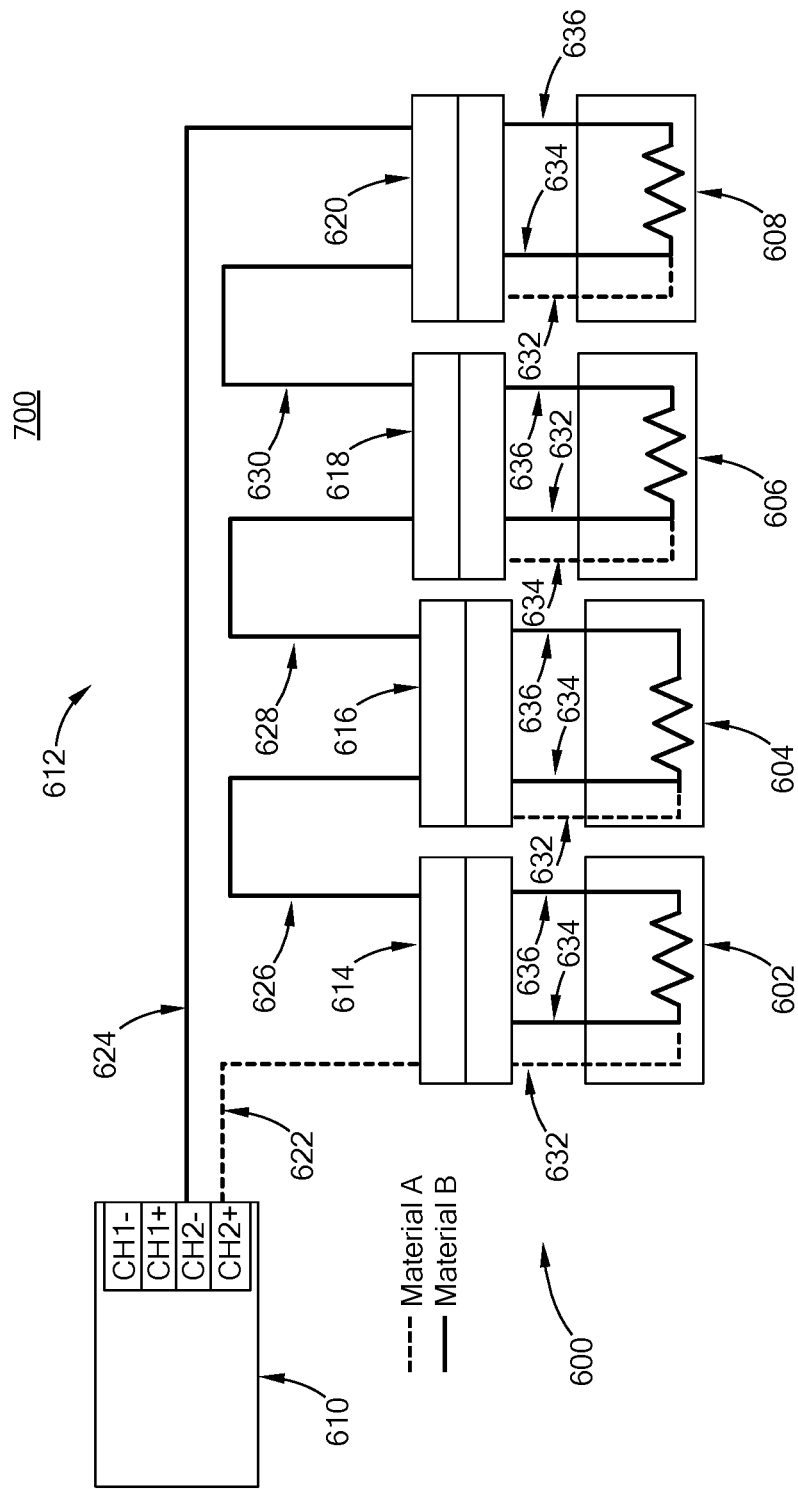
FIG. 22 is an electric diagram of FIG. 20.

Referring to FIG. 22, an electric diagram illustrating the electric circuit of the heater system 700 including the power control system 600 and the plurality of heaters of FIG. 20 is shown. The plurality of heaters 602, 604, 606, and 608 are connected in series in this order to form a first modular heater assembly. The main power supply wire 622 is made of the same first conductive material of the temperature sensing wires 632 as shown in dashed line. The main power return wire 624 and the connecting wires 626, 628, 630 are made of the same second conductive material of the auxiliary power supply wire 634 and the auxiliary power return wire 636 as shown in solid lines. As an example, the first conductive material may be Constantan, and the second conductive material may be Chromel®.

When the control system 600 is in the power mode, the power is supplied from CH2+ of the controller 610 through the main power supply wire 622, the temperature sensing wire 632 and the auxiliary power return wire 636 of the first heater 602, the connecting wire 626, the auxiliary power supply wire 634 and the auxiliary power return wire 636 of the second heater 604, the connecting wire 628, the auxiliary power supply wire 634 and the auxiliary power return wire 636 of the third heater 606, the connecting wire 630, the auxiliary power supply wire 634 and the auxiliary power return wire 636 of the fourth heater 608. The electric current returns to CH2- of the controller 610 through the main power return wire 624.

When the control system 600 is in the temperature sensing mode, the electric current path is the same as that in the power supply mode. The thermocouple junction 635 of the first heater 602 is used to measure a temperature of the first heater 602. The temperature of the first heater 602 is also the temperature of the first modular heater assembly because the first, second, third and fourth heater are connected in series. The signal relating to the temperature measurement is transmitted to the controller 610 via the temperature sensing wire 632 and the auxiliary power return wire 636 of the first heater 602 and the other wires forming the circuit.

Only one of the thermocouple junctions 635 in the first modular heater assembly is used for temperature sensing. In the first modular heater assembly, the thermocouple junction 635 in the first heater 602 that is directly connected to the controller 610 by the main power supply wire 622 is used for temperature sensing. The main power supply wire 622 is made of the same first conductive material of the temperature sensing wire 632 and may be considered an extension of the temperature sensing wire in the first modular heater assembly.

Figure 23:
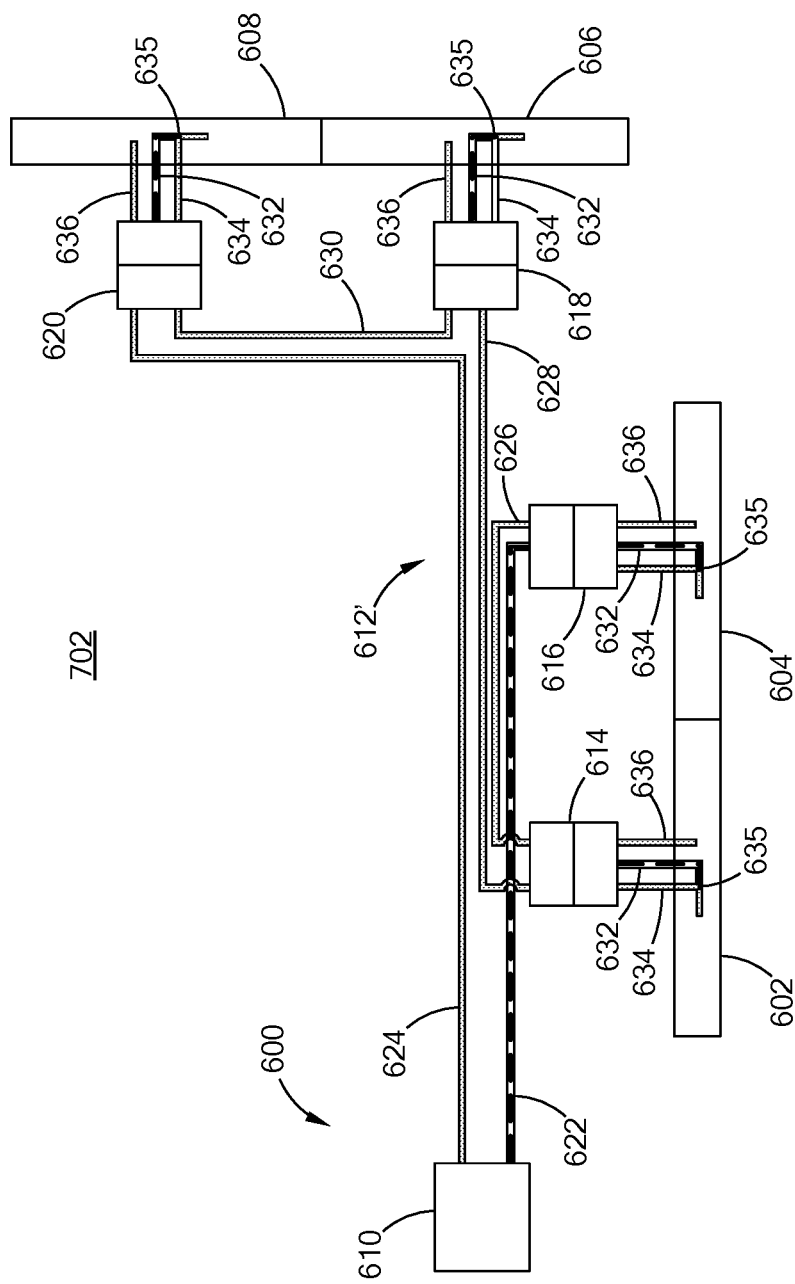
FIG. 23 is a schematic diagram of a heater system including a plurality of heaters and a power control system constructed in accordance with the teachings of the present disclosure, wherein the power control system includes a wire harness that connects the plurality of heaters in a second series connection to form a second modular heater assembly.

Referring to FIG. 23, a heater system 702 including a power control system 600 and a plurality of heaters 602, 604, 606, 608 connected and controlled by the power control system 600 is shown. The power control system 600 includes a wire harness 612', which routes the plurality of heaters 602, 604, 606, 608 in a second series connection. In the following, like elements will be designated by like reference numerals and the description thereof will be omitted for clarify.

In this wiring connection, the second heater 604, the first heater 602, the third heater 606, and the fourth heater 608 are connected in series in this order to form a second modular heater assembly and the power is supplied to the second heater 604 first. In this wiring connection, only the second heater 604 is used as both a heater and a temperature sensor by selectively using the temperature sensing wire 632 and the auxiliary power return wire 636 for the second heater to form a part of the electric circuit. The other heaters 602, 606, 608 are used to perform only the function of heaters by selectively using the auxiliary power supply wires 634 and the auxiliary power return wires 636 to form a part of the circuit and by bypassing the temperature sensing wires. Only the thermocouple junction 635 of the second heater 604 is used for temperature sensing of the second modular heater assembly. Like the first modular heater assembly of FIG. 20, the main power supply wire 622 and the temperature sensing wires 632 are made of the first conductive material (such as Constantan), and the remaining wires are made of the second conductive material (such as Chromel®). The main power supply wire 622 may be considered an extension of the temperature sensing wire 632 for the second heater 604 for temperature sensing purposes.

Figure 24:
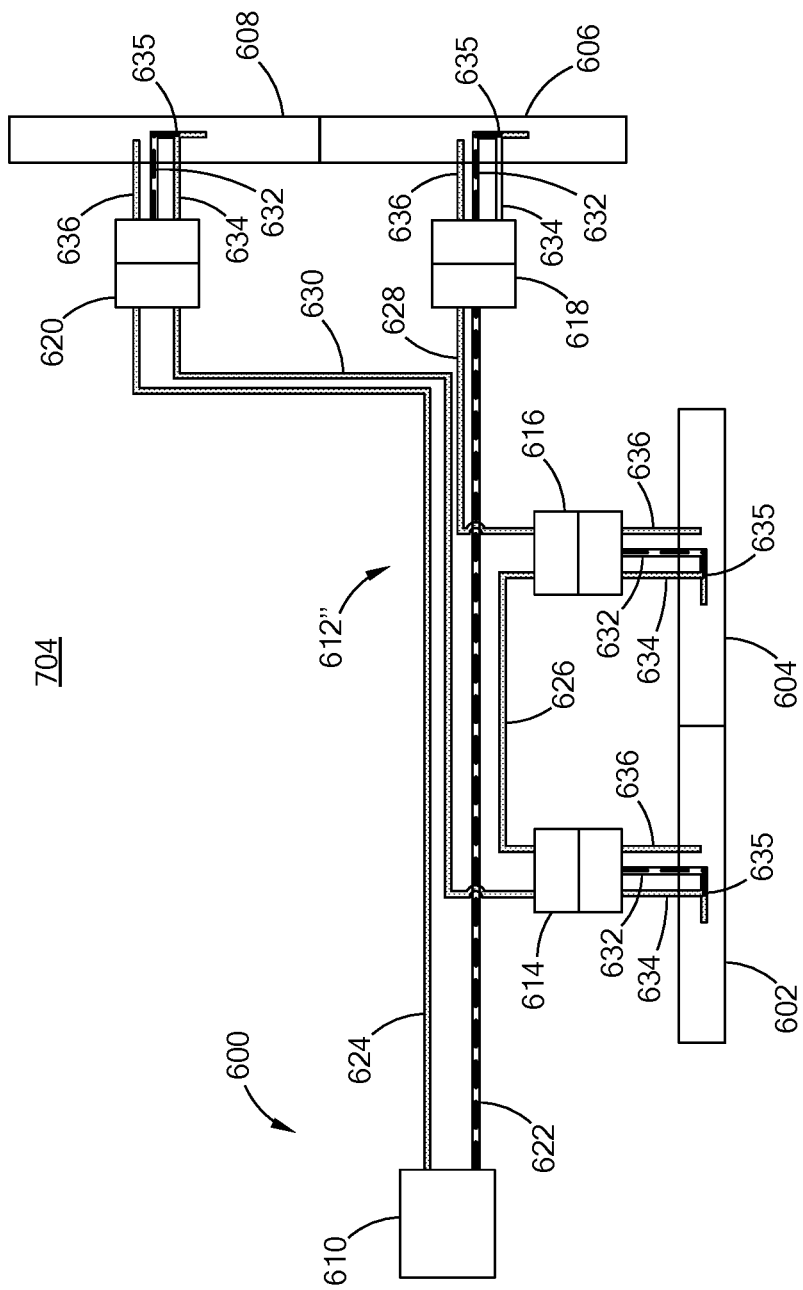
FIG. 24 is a schematic diagram of a heater system including a plurality of heaters and a power control system constructed in accordance with the teachings of the present disclosure, wherein the power control system includes a wire harness that connects the plurality of heaters in a third series connection to form a third modular heater assembly.

Referring to FIG. 24, a heater system 704 including a power control system 600 and a plurality of a heaters 602, 604, 606, 608 connected and controlled by the power control system 600 is shown. The power control system 600 includes a wire harness 612", which routes the plurality of heaters 602, 604, 606 and 608 in a third series connection. In this wiring connection, the third heater 606, the second heater 604, the first heater 602, and the fourth heater 608 are connected in series in this order to form a third modular heater assembly and the power is supplied to the third heater 606 first. In this wiring connection, only the third heater 606 is used to perform the function of both a heater and a temperature sensor and the thermocouple junction 635 of the third heater 606 is used for temperature sensing. The other heaters 602, 604, 608 are used as heaters only by bypassing the temperature sensing wires 632 associated with these heaters. Similarly, the main power supply wire 622 and the temperature sensing wires 632 are made of the first conductive material (such as Constantan), and the remaining wires are made of the second conductive material (such as Chromel®). The main power supply wire 622 may be considered an extension of the temperature sensing wire 632 for the third heater 606 for temperature sensing purposes.

Figure 25:
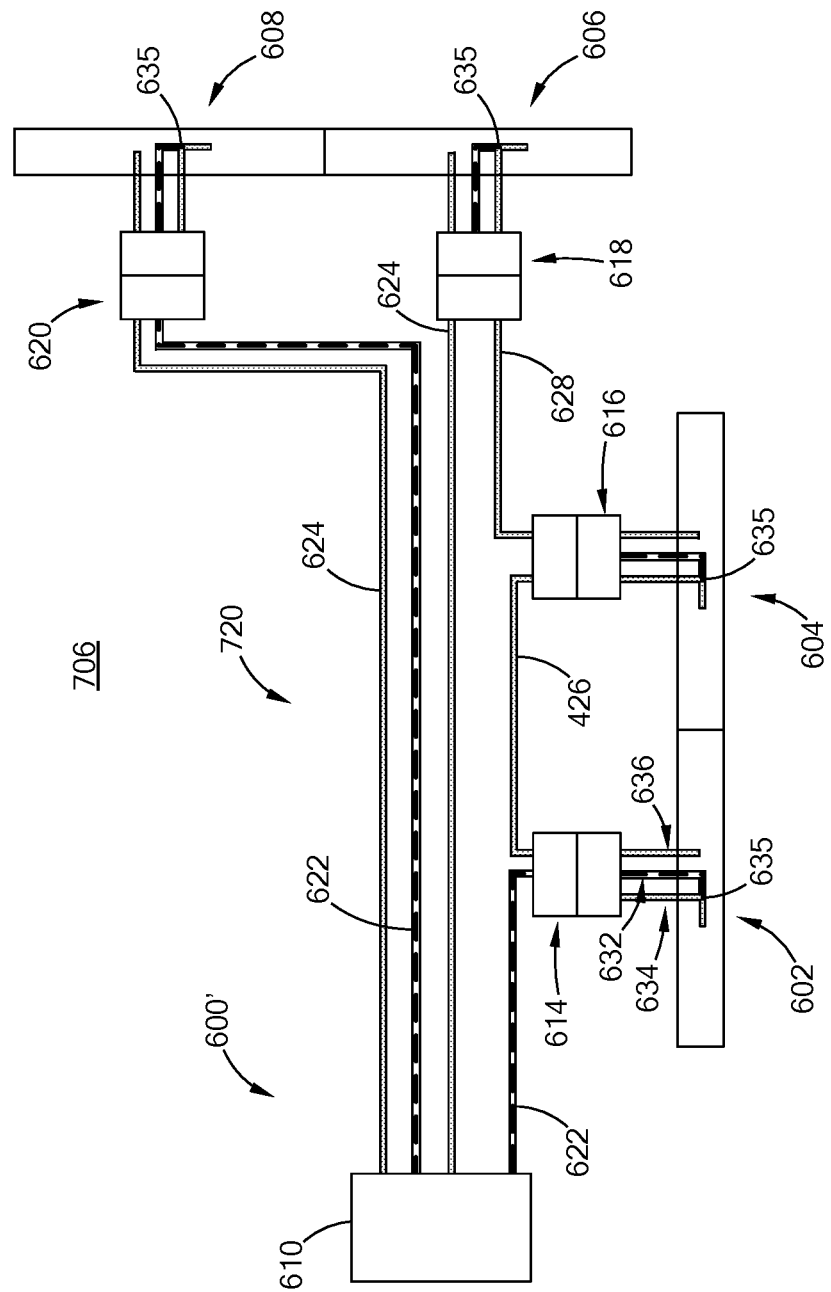
FIG. 25 is a schematic diagram of a heater system including a plurality of heaters and a power control system constructed in accordance with the teachings of the present disclosure, wherein the power control system includes a wire harness that connects the plurality of heaters into a stand-alone heater and a fourth modular heater assembly.
Figure 26:
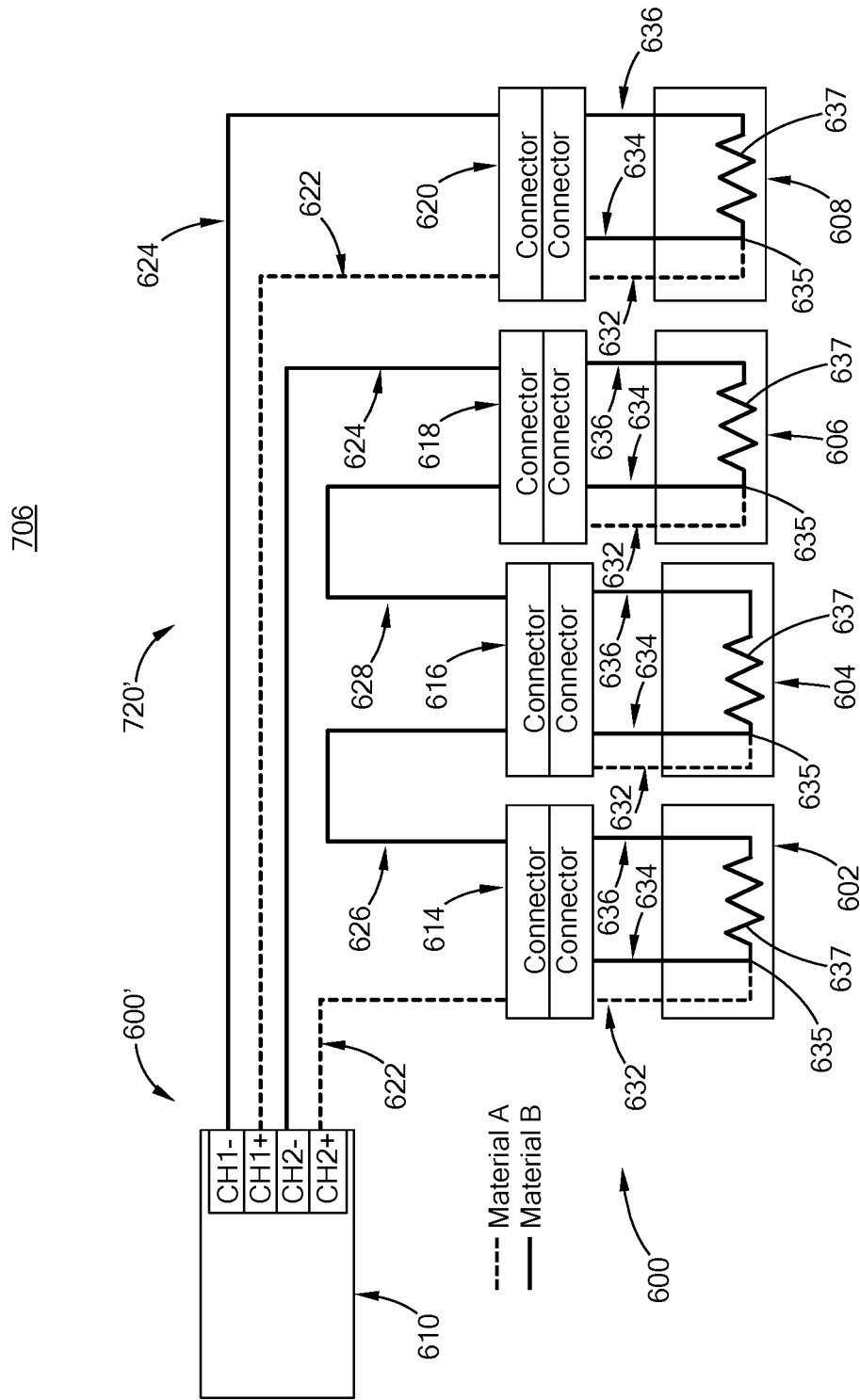
FIG. 26 is an electric diagram of FIG. 25.

Referring to FIGS. 25 and 26, a heater system 706 including a power control system 600' and a plurality of a heaters 602, 604, 606, 608 connected and controlled by the power control system 600 is shown. The power control system 600' includes a wire harness 720, which includes two sets of main power supply wires 622 and main power return wires 624 for routing one of the heaters (i.e., the fourth heater 608) as a stand-alone heater, and the remaining ones of the heaters (i.e., the first, second and third heaters 602, 604, 606) in a series connection.

The first set of main power supply and return wires connect the first heater 602, the second heater 604, the third heater 608 in series in this order to form a fourth modular heater assembly and the power is supplied from the controller 610 to the first heater 602 first. The second set of main power supply and return wires directly connect the fourth heater 608 to the controller 610 such that the fourth heater 408 becomes a stand-alone heater. The fourth heater 608 is controlled independently from the fourth modular heater assembly.

In this fourth modular heater assembly, only the first heater 602 is used as both a heater and a temperature sensor and the thermocouple junction 635 of the first heater 602 is used for temperature sensing. The fourth heater, which is a stand-alone heater, also functions as both a heater and a temperature sensor and the thermocouple junction 635 of the fourth heater is also used for measuring temperature of the fourth heater 608.

Similarly, the two main power supply wires 622 and the temperature sensing wires 632 are made of the first conductive material (such as Constantan), and the remaining wires are made of the second conductive material (such as Chromel®).

Referring to FIG. 27, a heater system 708 including a power control system 600" and a plurality of heaters 650, 652, 654, 656 connected and controlled by the power control system 600" is shown. The power control system 600" includes a plurality sets of auxiliary wires 632', 634', 636', 660, 662 attached to the plurality of heaters 650, 652, 654, 656, and a wire harness 722 for connecting the plurality sets of auxiliary wires to the controller 610. The wire harness 722 includes two sets of main power supply wires 622 and main power return wires 624 for routing one of the heaters (e.g., the fourth heater 656) as a stand-alone heater, and the remaining ones of the heaters (i.e., the first, second and third heaters 650, 652, 654) in a series connection. The first heater 650, the second heater 652, and the third heater 654 are connected in series in this order to form a fifth modular heater assembly.

Each set of the auxiliary wires is attached to a corresponding heater and includes five wires, including a temperature sensing wire 632', an auxiliary power supply wire 634', an auxiliary power return wire 636', a first routing wire 660, and a second routing wire 662. The structure and function of the temperature sensing wire 632', the auxiliary power supply wire 634' and the auxiliary power return wire 636' are the same as that of the temperature sensing wire 632, the auxiliary power supply wire 634, and the auxiliary power return wire 636 and thus the detailed description thereof is omitted herein for clarity. The first routing wire 660 and the second routing wire 662 in each set are connected to each other and are used to help connect the first, second and third heater in a desired order. In each set of five wires, only four of the five wires in each set of auxiliary wires are used in each mode of heater operation and one of the five wires in each set is bypassed.

The first set of main power supply wire 622 and main power return wire 624 are connected to the fifth modular heater assembly. In the fifth modular heater assembly, the third heater 654 is the master control heater whose thermocouple junction 635 and temperature sensing wire 632 are used for temperature sensing. The third heater 654 functions as both a heater and a temperature sensor by selectively using the temperature sensing wire 632' for the third heater 654 to form a part of the electric circuit. The temperature sensing wires 632 of the first and second heaters 650, 652 are bypassed and the first and second heaters perform the function of a heater only. The second set of main power supply wire 622 and the main power return wire 624 connect only one heater, i.e., the fourth heater 656, to the controller 610. The thermocouple junction 635 and the temperature sensing wire 632 of the fourth heater 656 are also used for measuring temperature of the fourth heater 656.

Unlike the wire harness 612, 612', 612", 720 in the first to fourth modular heater assembly, the wire harness 722 of the present form includes a plurality pairs of connectors 614, 614', 616, 616', 618, 618', 620, 620' corresponding to the plurality of heaters 650, 652, 654, 656. Each heater is connected to a pair of connectors. Moreover, the temperature sensing wire is attached to the auxiliary power return wire, not the auxiliary power supply wire, in each set of the auxiliary wires extending from the heater. Therefore, the thermocouple junction is formed between the auxiliary power return wire 636' and a temperature sensing wire 632' in each of the sets of auxiliary wires. The temperature sensing wires 632' and the main power return wires 624' are made of the first conductive material (e.g., Constantan), and the remaining wires are made of the second conductive material (e.g., Chromel®). The main power return wires 624' are considered extensions of the temperature sensing wires 632' for temperature sensing purposes.

Referring to FIG. 28, a heater system 710 including a power control system 600''' and a plurality of heaters 650, 652, 654, 656 connected and controlled by the power control system 600''' is shown. The power control system 600''' includes a wire harness 720, which includes two sets of main power supply wires 622 and main power return wires 624 for routing one of the heaters (i.e., the fourth heater 656) as a stand-alone heater, and the remaining ones of the heaters (i.e., the first, second and third heaters 650, 652, 654) in a series connection. The first, second and third heaters 650, 652, 654 are connected in series in this order to form a sixth modular heater assembly. In the sixth modular heater assembly, the second heater 652 is the master control heater whose thermocouple junction 635 and temperature sensing wire 632' are used for temperature measurement and temperature signal transmission. The master control heater is disposed in the center of the sixth modular heater assembly. The first set of main power supply wire 622 and main power return wire 624 are connected to the sixth modular heater assembly. The second set of main power supply wire 622 and the main power return wire 624 connect only the fourth heater 656 to the controller 610 such that the fourth heater becomes a stand-alone heater.

Three connectors and six auxiliary wires are used for connecting the second heater 652 to the controller 610, to the first heater 650, and the third heater 654. Two connectors and five auxiliary wires are used for connecting each of the first heater 650 and the third heater 654 to another heater. Two connectors and five auxiliary wires are used for connecting the fourth heater 656 to the controller 610. Each set of the auxiliary wires for the first heater 650, the third heater 654 and the fourth heater 656 includes five wires, including a temperature sensing wire 632', an auxiliary power supply wire 634', an auxiliary power return wire 636', a first routing wire 660, and a second routing wire 662, similar to that of FIG. 27. However, the set of auxiliary wires for the second heater 652, which is used as the main control heater, includes six wires. The six wires include a temperature sensing wire 632', an auxiliary power supply wire 634', and four routing wires 664. All of the six wires are used in each mode of heater operation.

In the present form, the thermocouple junction 635 for the second heater 652 is formed between the temperature sensing wire 632' and the resistive heating element 637. The thermocouple junctions 635 for the first and third heaters 650, 654 are formed between the temperature sensing wires 632', the auxiliary power supply wires 634', and the resistive heating elements 637. The thermocouple junction 635 for the fourth heater 656 is formed between the temperature sensing wire 632', the auxiliary power return wire 636', and the resistive heating element 637. All of the temperature sensing wires 632' and the two main power return wires 624 are made of the first conductive material (Material A, such as Constantan), whereas the remaining wires (including the two main power supply wires 622, the connecting wires 640 connecting to the same or adjacent connectors, the auxiliary power supply wires 634', the auxiliary power return wires 636' and the routing wires 660, 662) are made of a second conductive material (Material B, such as Chromel®).

In summary, the power control system 600, 600', 600", or 600'" constructed in accordance with the teachings of the present disclosure include a wire harness 612, 612', 612", 720, 722, or 724 that allows the various wires to be routed via connectors to achieve various wiring connections. Some or all of a plurality of heaters may be connected in series in different orders, while the other heaters may be routed as stand-alone heaters and controlled independently from other heaters. While not shown in any of the forms, it is understood that the wire harness may include a plurality sets of main power supply wires and main power return wires corresponding to the plurality of heaters. Each set of main power supply wire and main power return wire connects only one heater to the controller such that each heater becomes a stand-alone heater and is controlled independently.

Moreover, the power control system includes a plurality sets of auxiliary wires disposed between the plurality of connectors and the heaters. The auxiliary wires may be always attached to the heaters and adjacent connector part (whether a male part or a female part) of the connectors to form a plurality of modular heater units. The plurality of modular heater units may be easily connected in series in any order or as stand-alone heaters by connecting the connector parts to another connector parts via proper wiring. Therefore, the wire harness improves modularity of the plurality of heaters.

Further, in some forms, each of the plurality sets of auxiliary wires includes three wires including a temperature sensing wire, an auxiliary power supply wire, and an auxiliary power return wire. Two of the three wires are joined to form a thermocouple junction. One of the two wires that are joined is selected to form a part of the electric circuit depending on whether the associate heater is used as a heater only or as both a heater and a temperature sensor in the electric circuit. The three-wire mechanism extending from each heater allows each heater to selectively function as both a heater and a temperature sensor, thereby eliminating the use of additional temperature sensors in the heater system and providing a heater system with a simpler design.

In other forms, the sets of auxiliary wires may include five wires or six wires. In addition to the temperature sensing wire, the auxiliary power supply wire, and the auxiliary power return wire, additional routing wires may be included in each set of auxiliary wires to increase the routing options in order to connect these heaters in different orders and to use any one of the heaters as the master control heater, which is used as both a heater and a temperature sensor.

In the figures, the direction of an arrow, as indicated by the arrowhead, generally demonstrates the flow of information (such as data or instructions) that is of interest to the illustration. For example, when element A and element B exchange a variety of information, but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, the term "module" and/or "controller" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The term memory is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general-purpose computer to execute one or more particular functions embodied in computer programs. The functional blocks, flowchart components, and other elements described above serve as software specifications, which can be translated into the computer programs by the routine work of a skilled technician or programmer.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice; material, manufacturing, and assembly tolerances; and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A heater system comprising:
   a plurality of heaters each including a set of auxiliary wires;
   a plurality of first connector parts each connected to the set of auxiliary wires of a corresponding one of the heaters;
   a plurality of second connector parts removably connected to the plurality of first connectors; and
   a main power supply wire, a main power return wire and at least one connecting wire,
   wherein the second connector parts are configured to selectively connect the main power supply wire, the main power return wire and the at least one connecting wire to the first connector parts to change connections among the plurality of heaters,
   wherein each set of auxiliary wires includes a temperature sensing wire, an auxiliary power supply wire, and an auxiliary power return wire, and
   wherein in each set of auxiliary wires, the temperature sensing wire is joined to one of the auxiliary power supply wire and the auxiliary power return wire to form a thermocouple junction, the thermocouple junction is joined to an end of the resistive heating element of each heater, and the material of the temperature sensing wire is different from the one of the auxiliary power supply wire and the auxiliary power return wire such that each of the plurality of heaters is operable to function as both a heater and a temperature sensor.

2. The heater system according to claim 1, wherein the second connector parts each connect two of the main power supply wire, the main power return wire, and the at least one connecting wire to two of the set of auxiliary wires of a corresponding one of the heaters.

3. The heater system according to claim 1, wherein the second connector parts each connect only two of the main power supply wire, a main power return wire and at least one connecting wire to only two of the set of at least three auxiliary wires of a corresponding one of the heaters.

4. The heater system according to claim 1, wherein the set of auxiliary wires of each heater extend into a corresponding one of the first connector parts.

5. The heater system according to claim 1, wherein the plurality of heaters each include a resistive heating element, each set of auxiliary wires connected to and extending from the resistive heating element of a corresponding one of the heater.

6. The heater system according to claim 1, wherein the temperature sensing wire is made of a first conductive material, and the auxiliary power supply wire and the auxiliary power return wire are made of a second conductive material.

7. The heater system according to claim 6, wherein the first conductive material is a copper-nickel alloy and the second conductive material is a nickel-chromium alloy.

8. The heater system according to claim 1, further comprising a controller for supplying power to the plurality of heaters, wherein the main power supply wire and the main power return wire are directly connected to the controller, and wherein one of the main power supply wire and the main power return wire is made of a same material of the temperature sensing wires of the plurality sets of auxiliary wires.

9. The heater system according to claim 1, wherein the plurality of first connector parts are directly connected to the plurality sets of auxiliary wires.

10. The heater system according to claim 1, wherein the main power supply wire and the main power return wire are selectively connected to a same one of the second connector parts to route one of heaters as a stand-alone heater.

11. The heater system according to claim 1, wherein the main power supply wire and the main power return wire are selectively connected to different ones of the second connector parts such that at least some of the heaters are connected in series.

12. A heater system comprising:
    a plurality of modular heater units each comprising:
       a heater comprising a resistive heating element;
       a set of auxiliary wires connected to and extending from the resistive heating element of the heater, the set of auxiliary wires including a temperature sensing wire, and auxiliary power supply wire, and an auxiliary power return wire;
       a first connector part connected to the set of auxiliary wires; and
       a second connector part removably connected to the first connector; and
    a main power supply wire, a main power return wire and at least one connecting wire,
    wherein the second connector parts of the plurality of modular heater units each are configured to selectively connect two of the main power supply wire, the main power return wire and the at least one connecting wire to one of the first connector parts to change connections among the plurality of modular heater units, and
    wherein each set of the auxiliary wires include a temperature sensing wire, an auxiliary power supply wire and an auxiliary power return wire, wherein the temperature sensing wire is joined to one of the auxiliary power supply wire and the auxiliary power return wire to form a thermocouple junction, the thermocouple junction being joined to an end of the resistive heating element, and wherein the temperature sensing wire and the one of the auxiliary power supply wire and the auxiliary return wire are made of different materials such that the heater is operable to function as both a heater and a temperature sensor.

13. The heater system according to claim 12, wherein each set of the auxiliary wires include a temperature sensing wire, an auxiliary power supply wire and an auxiliary power return wire, and wherein the second connector parts of the plurality of modular heater units each are configured to selectively connect two of the main power supply wire, the main power return wire and the at least one connecting wire to two of the set of auxiliary wires of one of modular heater units.

14. The heater system according to claim 12, wherein the first conductive material is a copper-nickel alloy, and the second conductive material is a nickel-chromium alloy.

15. The heater system according to claim 12, wherein only two of the set of auxiliary wires are connected to another electrical component to form a part of an electric circuit.

16. The heater system according to claim 12, wherein the main power supply wire and the main power return wire are selectively connected to a same one of the second connector parts to route one of heaters as a stand-alone heater.

17. The heater system according to claim 12, wherein the main power supply wire and the main power return wire are selectively connected to different ones of the second connector parts such that at least some of the heaters are connected in series.

* * * * *